(12) United States Patent
Howorka et al.

(10) Patent No.: US 7,693,774 B2
(45) Date of Patent: Apr. 6, 2010

(54) CREDIT LIMIT STORAGE IN AN ANONYMOUS TRADING SYSTEM

(75) Inventors: Edward R. Howorka, Morris Plains, NJ (US); Neena Jain, South Plainfield, NJ (US); Steven Iaccheo, Lincoln Park, NJ (US); Vladimir Neyman, West Orange, NJ (US); James Shu, East Hanover, NJ (US); Michael S. Merold, Sparta, NJ (US); Alastair G. Crane, London (GB); Srivathsan Krishnasami, New York, NY (US); Roy S. McPherson, Essex (GB); Paul M. Ginsberg, Stamford, CT (US); Gregory D. Mills, Flanders, NJ (US)

(73) Assignee: EBS Group Limited, London (GB)

( * ) Notice: Subject to any disclaimer, the term of this patent is extended or adjusted under 35 U.S.C. 154(b) by 794 days.

(21) Appl. No.: 09/896,220

(22) Filed: Jun. 29, 2001

(65) Prior Publication Data

US 2002/0133455 A1    Sep. 19, 2002

Related U.S. Application Data

(63) Continuation-in-part of application No. 09/602,496, filed on Jun. 23, 2000.

(51) Int. Cl.
*G06Q 40/00* (2006.01)
(52) U.S. Cl. .............................. 705/37; 705/38; 705/39; 705/42; 705/44; 235/380
(58) Field of Classification Search ............. 705/37–39, 705/42, 44; 235/380
See application file for complete search history.

(56) References Cited

U.S. PATENT DOCUMENTS 6,014,627 A    1/2000 Togher et al.

FOREIGN PATENT DOCUMENTS

| EP | 0 512 702 | 4/1992 |
| EP | 1 104 904 A1 | 6/2001 |
| WO | WO-00/16224 | 3/2000 |

OTHER PUBLICATIONS

Fan, M., et al "A Web-Based Financial Trading System," Computer, vol. 32, No. 4, Apr. 1999.*
Else, J., "Open Outcry," Chicago Mercantile Exchange, Nov. 17, 2000.*
CME Foreign Exchange Products: Trading CME FX Futures: Maximizing the Opportunity for the Individual Investor. Chicago Mercantile Exchange, 2005.*
Berkely, A. R., "Nasdaq's Technology Floor: Its President takes stock" IEEE Spectrum, vol. 34, No. 2, Feb. 1997, p. 66.*
Australian Patent Office Search Report mailed Dec. 10, 2002.

* cited by examiner

*Primary Examiner*—Daniel S Felten
(74) *Attorney, Agent, or Firm*—Dickstein Shapiro LLP

(57) ABSTRACT

An anonymous trading system comprises a network of broker nodes each of which perform price matching, deal execution and market distribution. Trader terminals on trading floors are connected to a given broker node via a trading agent node. Credit may be stored for a given trading floor at its trading agent node or at a credit agent node which stores credit limits for a group of trading floors. Where the credit limits of a party to a proposed deal are stored at a credit agent node, the deal execution process is routed through that credit agent node to check for available credit. The system allows institutions to adopt any combination of local and global credit assignments with counterparties with which it wishes to trade.

15 Claims, 11 Drawing Sheets

CREDIT LIMIT STORAGE IN AN ANONYMOUS TRADING SYSTEM

RELATED APPLICATIONS

This is a continuation-in-part of U.S. patent application Ser. No. 09/602,496, filed Jun. 23, 2000, priority of which is claimed under 35 U.S.C. §120.

FIELD OF THE INVENTION

This invention relates to electronic brokerage systems and in particular to systems in which counterparties trade anonymously within fixed credit limits. Such systems may trade financial instruments such as foreign exchange and forward rate agreements. The invention is particularly concerned with the handling of credit limits between counterparties in such systems.

BACKGROUND TO THE INVENTION

A number of anonymous trading systems are known in the art. EP-A-0,399,850, EP-A-0,406,026 and EP-A-0,411,748 all assigned to Reuters Ltd disclose aspects of an automated matching system in which a host computer maintains a central database of bids and offers submitted by terminals connected to the host via a network. The host also maintains records of credit limits between each trading bank and the possible counterparties with which it is willing to trade. The host computer uses information in its central database to match bids and offers and buy and sell orders based on matching criteria which include the counter party credit limits.

Generally, counterparty credit limits are set for each bank or each trading floor and the host computer establishes a gross counter party credit limit for each possible pair of counterparties. The gross counter party credit limit is the minimum amount of remaining credit between two counterparties.

A trader's terminal will display a subset of the trading book, typically the best few bids and offers. These will be updated periodically to ensure that the trader sees the true state of the market.

A problem with the system outlined above is that the trader sees the bids and offers irrespective of whether he has sufficient credit with the counter party submitting that bid or offer to trade. As a result, a trader can attempt to trade when there is no available credit. As the system is anonymous the trader has no knowledge of the counterparty until a trade as been completed and so, when he hits a bid or offer, has no idea as to whether it is likely to be accepted or rejected for lack of credit. This is extremely frustrating for a trader, particularly in a fast moving market in which trading opportunities can easily be lost. The problem arises as the host computer only checks available credit after a deal has been proposed and a potential match identified.

This problem was solved in WO93/15467 now assigned to EBS Dealing Resources inc. Instead of displaying the actual trading book, or a part of it, to each trader, a different market view is shown to each trader in which bids and offers from counterparties which whom they have insufficient or no credit are screened out. Thus, the trader only sees prices with which he knows he can deal.

The architecture of the system of WO93/15467 is very different from the of the Reuters system and is based on a distributed network with a number of arbitrators which perform matching. Actual credit limits are stored at local bank nodes to which each of a bank's trading terminals are connected ensuring that sensitive credit data does not leave the bank's physical site. The actual trading book is sent by the arbitrators to the market distributor. The market distributor forms a market view specific to a given trading floor and sends it to the relevant bank node. A different market view may be formed for each trading floor depending on credit criteria. Thus, the market view which is distributed to each of the bank nodes is the complete market view with credit screening taking place, the market distributor to filter out any prices with which the bank, or a given trading floor within the bank, has insufficient credit.

In addition, the market distributers also have limited credit information, maintaining a credit matrix which may store a simple "yes-no" credit indicator for given counterparties. When a match is made, the prices having already been screened for credit, the bank node will make a second credit check using the credit matrix to see whether any previously extended credit has already been exhausted.

In the system of WO93/15467, a particular trading floor can assign credit to other trading floors on an individual basis or to trading floors grouped together as a credit entity. However, there is no provision for the assignment of credit lines from an institutional level or at a global level.

Credit functionality resides at the bank nodes which maintain information about the credit groups and the actual credit limit amounts. The bank node sends credit information to the arbitrator but only on a yes/no credit relationship. The amount of credit for a given counterparty can change either due to daily automatic reset or manual intervention by a trading floor administrator, or during the course of a deal. Whenever credit available drops to zero, or is reset to a positive amount from zero a credit update message is sent from the bank node to the arbitrator for the floors belonging to that credit group.

While both the above systems have been used successfully in the financial trading markets for a number of years, they both suffer from the disadvantage that they are very inflexible in the way they handle credit. They require banks to tie up large amounts of credit in one area of their trading activities. A typical bank will be trading a number of financial instruments and a number of different markets and will want to trade up to its credit limits in each trading day. If one particular market is quiet it will want to be able to divert the credit assigned to that market to a different field. Similarly, if a particular market is very active it will want to be able to take advantage of that activity. It should be remembered that a given bank may be dealing with many of the same counterparties in different markets. It is thus undesirable to tie up credit to trades in one particular instrument with a given counterparty as this may diminish the bank's trading capacity within its own global trading limits. Also, the manner in which credit limits are assigned does not reflect the manner in which many banks handle and assign credit. This results in a system which has to be treated differently, as far as credit is concerned, by a bank which discourages banks from using the system.

SUMMARY OF THE INVENTION

The present invention aims to provide a system in which the manner in which credit is assigned is more flexible than the prior art systems.

An embodiment of the invention provides an anonymous trading system for trading financial or other instruments which include a communications network for transmitting electronic messages. A plurality of trader terminals are connected to the network, each can generate electronic price quotation messages which includes bid and/or offer prices and can communicate to the trader information from other trader terminals. One or more matching engines are connected to the network for matching bids and offers and, when a match is made, for executing deals. A market distribution means connected to the network distributes price messages to the trader terminals and is responsive to price quotation messages and the matching engines. Credit limit storage means store credit limits available for trades between a trading floor or group of trading floors and possible counterparty trading floors or groups of trading floors. The credit limit storage means includes at least one credit agent node which stores credit limits for a group of trading floors.

The use of a credit agent node enables credit for an institution to be handled globally. That is, credit does not have to be allocated on a floor by floor basis. This allows users of the system the flexibility of assigning credit from trading floor to counterparty trading floor, from one of a number of groups of trading floors to individual or a number of groups of trading floors, from institution to institution or any combination of these local and global credit arrangements. This allows users of the system greater flexibility than prior art systems and assist in the full utilisation of available credit limits during the course of a trading day.

Preferably, the trader terminals are connected to the network through trading agent nodes. The credit agent node may also be a trading agent node for simplicity. Each trading agent node which does not hold its own credit information for connected trader terminals includes means for sending credit enquiry messages to the credit agent node on receipt of a proposed deal message. The credit agent includes a means for receiving the credit enquiry messages for the trading agent nodes, for checking the available credit and for indicating to the system whether the deal can proceed. Preferably, the indication may show that deal can proceed for the part of the proposed amount if there is insufficient credit for the whole deal. Preferably, the credit agent node is not directly connected to the trading agent node and credit enquiry messages are sent via one of the matching engines. It is preferred that the deal indicator message from the credit agent is sent to one of the matching agents which routes it to the counterparty trading agent.

In one preferred embodiment, the credit limit storage means of a given party interfaces to an external credit limit storage means of that plurality. This enables credit within the system to be treated as part of that party's overall credit scheme for that instrument, which may be traded through a variety of media, or that counterparty with which it may trade a variety of instruments.

The system may comprise many credit agent nodes.

In a second aspect of the invention, the credit agents are replaced by a credit broker associated with the matching engine and storing credit limits for a plurality of institutions, each stored credit limit representing the credit available for trades by the trading floors of the institution, or a group of trading floors of the institution with counterparty institutions or selected trading floors or groups of trading floors of counterparty institutions.

The use of a credit broker associated with the matching engine is advantageous as the time required to check credit is minimised. If both the maker and the taker in a deal are operating a global credit regime, the credit for both sides can be checked by the credit broker. This greatly reduces deal processing time.

In one preferred embodiment, the matching engine is an arbitrator as described in WO93/15467 and a credit agent is associated with each arbitrator, preferably connected by a local area network. In another preferred embodiment, the trading system comprises a number of cliques of broking nodes which perform the function of matching, deal execution and market distribution and the credit broker is integrated into the broking nodes so that each node has a credit broking function.

Credit for an institution may be allocated between credit brokers where multiple credit brokers are used. Preferably the system ensures that credit is allocated to the broker which is most likely to be called upon to perform a credit check. This is the credit broker associated with the most active arbitrator. Preferably, if credit for a deal is available, but not wholly allocated to the credit broker associated with the matching engine handling the deal, a request is sent to one of the other credit brokers asking for some of its credit allocation to be reserved.

Preferably, credit allocations can be transferred between credit brokers.

In one preferred embodiment of the invention, an automated trading system for anonymous trading of instruments, including financial instruments, comprises a computer communications network having a plurality of interconnected broking nodes which are connected to one or more trader terminals comprising a trading floor. Each broking node comprises a matching engine for matching bids and offers input into the system as price quotation messages from trader terminals, means for executing deals where prices are matched, and market distribution means for distributing price messages to the trader terminals in response to price quotation messages and the matching engine. One or more credit agent nodes are provided each of which store credit limits for trading floors connected to a number of trading agent nodes for trades with possible counterparty trading floors or groups of trading floors. Those trading agents whose connected trading floor credit limits are not stored at credit agent nodes include a credit storage means for storing their own credit limits.

Alternatively, the credit agent nodes could be replaced by a credit broker associated with the at least one matching engine for storing credit limits assigned by each of a plurality of institutions to a plurality of possible counterparty institutions.

BRIEF DESCRIPTION OF THE DRAWINGS

Embodiments of the invention will now be described, by way of example only, and with reference to the accompanying drawings, in which.

DESCRIPTION OF PREFERRED EMBODIMENT

A first aspect of the present invention will be described with reference to the dealing architecture illustrated in FIGS. 1 to 8 and which will be hereinafter described. However, it should be understood that this aspect of the invention is not limited to that architecture but could be implemented in any anonymous trading system. For example, it could be implemented on either of the Reuters and EBS Dealing Resources prior art systems known in the art and referred to earlier. Similarly, the second aspect of the invention will be described with reference to FIGS. 9 to 11 but the aspect described is not limited to the particular architecture configuration of those figures.

The electronic brokerage system to be described provides a platform for trading at least the following instruments: FX (Foreign Exchange) Spot, FRA's, and Forwards and also FX Forwards, CFDs, short-dated government and/or central bank paper, commercial bills, CDs, inter-bank deposits, commercial paper, repos, interest-rate futures, swaps, options and various tailor-made variants on these basic products. These are all referred to as financial instruments. It may also be used for trading non-financial products such as commodities.

Traders at trader terminals are connected to a communications network which allows electronic messages to be passed between terminals. These messages include the submission of quotes and hits which are then passed on to each of a plurality of broker nodes throughout the system. A quote is a bid or offer order submitted by a trader to "make a market" and is distributed to other traders as part of a market view. Quotes are thus orders visible to other traders. A hit is a buy or sell order submitted by a trader wishing to create a deal on the basis of a price displayed on his market view derived from one or more quotes. Hits are orders which are invisible to other traders.

Figure 1:
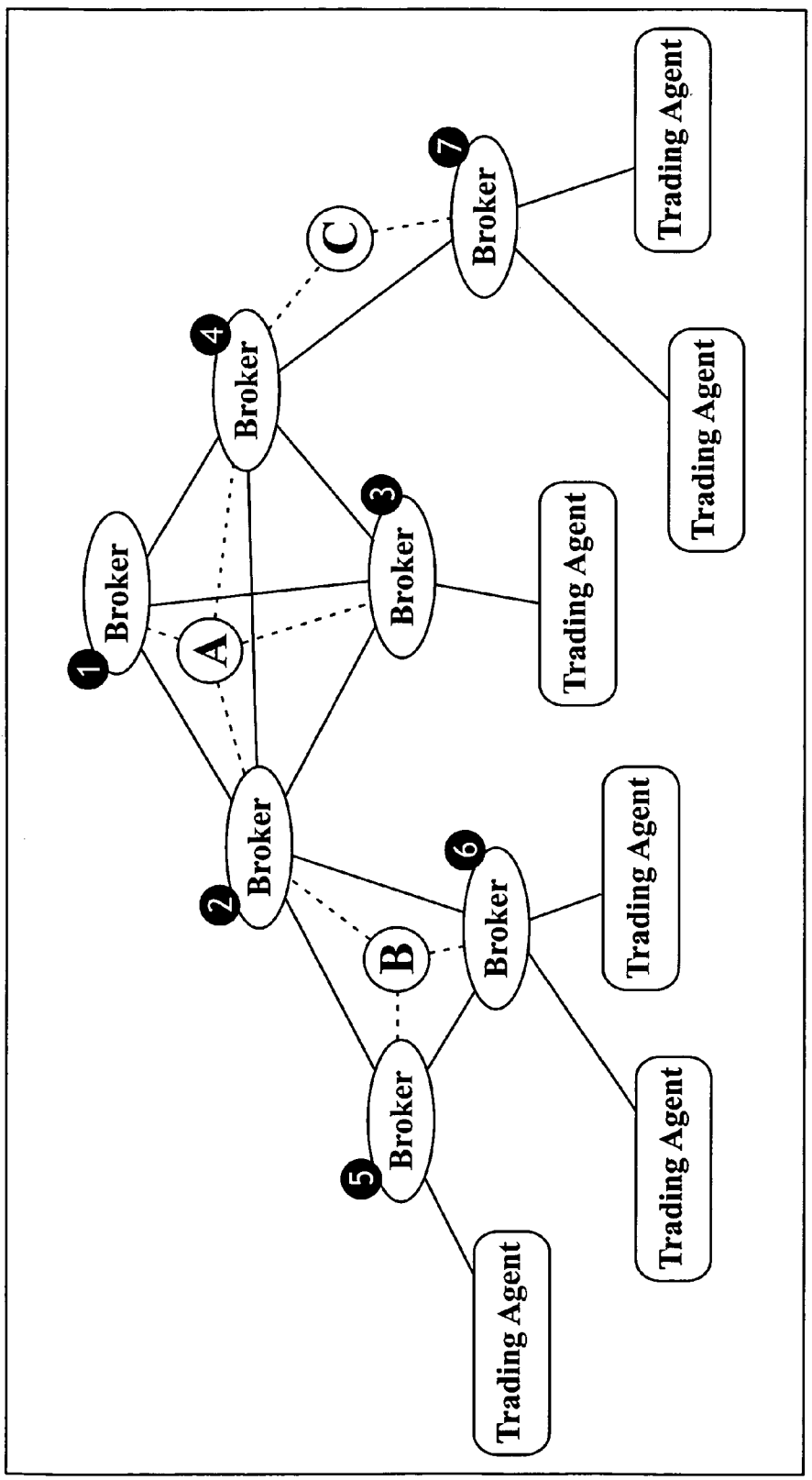
FIG. 1 is an overview of a trading system embodying a first aspect of the invention.

The computer trading system of FIG. 1 comprises a plurality of trading agents 10 each connected to at least one of a plurality of broker nodes 12. Each trading agent is the means by which the trader terminals access the trading system with a given trader terminal being attached to one or more trading agents.

Trader terminals (not shown) may be workstations or other computer terminals configured to generate and submit electronic order messages including bid and/or offer prices, quotes and orders (usually through use of a specialised key pad) and to communicate market view data, including price and amount available, for financial instruments to be traded. The communication is usually by display but could also be by printing the information, voice synthesis or otherwise. The trader terminals may input orders manually or automatically. In the latter case a trader may program a terminal to submit an order once the market reaches a predetermined state. Alternatively, the trader terminals may bot be individual work stations as such but integrated into an institutions automated dealing capability. All these variants are examples of order input devices.

Traders are typically grouped as part of a financial institution, such as a bank, which arranges traders as part of a trading floor. A trading floor is a group of traders under common control of a trading floor administrator who allocates credit lines for the trading floor against other trading floors. The market view for a trader, or group of traders, is the market information (price, volume, etc.) that the traders can see that reflect the market. The market views are preferably pre-screened for credit compatibility, as described in WO93/15467 the contents of which are incorporated herein by reference. Thus, traders only see displayed quotes with which they can trade. As well as extending credit to a trading floor, credit may be extended to a bank as a whole (many banks have several trading floors indifferent locations), or to an individual trader or group of traders. Credit may be extended from the bank as a whole, from a trading floor or from an individual trader. This process will be described in detail later.

The system is an anonymous trading system in which the market views produced by the brokers comprise price and amount information without identifying the source of the price. The prices displayed for available bids and offers and the amounts available at those prices, are thus aggregates of one or more quotes. Only the quotes of parties satisfying the pre-screen credit criteria are included in the aggregate price displayed. The market views produced by the broker nodes thus differ from one trading floor to another depending on the credit allocation.

The trading agent node provides services to a specific trading floor or group of traders. These services include providing access to the network for each trading work station, completing deals, producing deal tickets and maintaining historical dealing information for traders. Each trading agent node must connect to at least one broker node to access the trading system. A group of trader terminals thus connects to a trading agent 10 to access the system.

Each Broker node 12 provides the basic order matching and price distribution services. The Broker nodes are arranged in a structure called a Clique Tree which enables faster communications routing, following very specific but simple rules. The Clique Tree is a network structure where individual nodes are grouped into Cliques, and the Cliques are then arranged into a tree structure. Each Broker can be linked logically to a number of Brokers, which are referred to as its neighbor Brokers. Communication between Brokers is on an equal level, with no "up" or "down" direction in the network.

In the embodiment of FIG. 1, there are three Cliques: that formed by brokers 12a, 12b and 12c, that formed by brokers 12b, 12d, 12e and 12f and that formed by brokers 12e and 12f. It will be seen that brokers 12b and 12e are both in two Cliques. It will be appreciated that, for ease of understanding, only a simple example is illustrated. In practice the network may be very much more complex with a large number of cliques.

While Trading Agents must be connected to at least one Broker node, they are not members of the Clique Tree, but remain outside the structure. A Trading Agent connected to multiple Broker nodes will receive multiple sets of market prices. Even though the price information from different Broker nodes can be substantially the same, the information may be received at different intervals. A Trading Agent will send a given trading order to only one Broker node.

The term Broker node is used to describe a computer arranged as a physical or logical node in a computer network providing a broking function. The basic broking function is the storing of quotes, providing the quotes to traders in the form of a market view and matching quotes and orders. The Broker nodes in the described embodiment also perform further functions, but these are not essential features of what is defined as a Broker node.

Thus, the broker nodes each provide a matching engine which is connected to the network for matching submitted bids and offers and, when a match is made, for executing deals. They also perform the function of market distributors distributing prices messages to the trader terminals in response to the price quotation messages and the matching engine. Within the context of the present invention it is preferred that the matching and market distribution functions are amalgamated in the broking node but the invention is equally applicable to systems in which the functions are separate and performed at geographically and/or logically separate locations. An example of such a system is WO93/15467 referred to earlier.

The Broker nodes are equal to each other, and perform the same functions. The arrangement of the network or their position in it is transparent to the broker nodes. They only need to know about their neighbours. Each Broker node has knowledge of all orders in the market, and is able to match orders as soon as they are submitted. As each Broker node maintains a full list of orders in the market, it is therefore able to customize market views as needed by the Trading Agents and is able to react faster to market information as soon as it is received.

Figure 2:
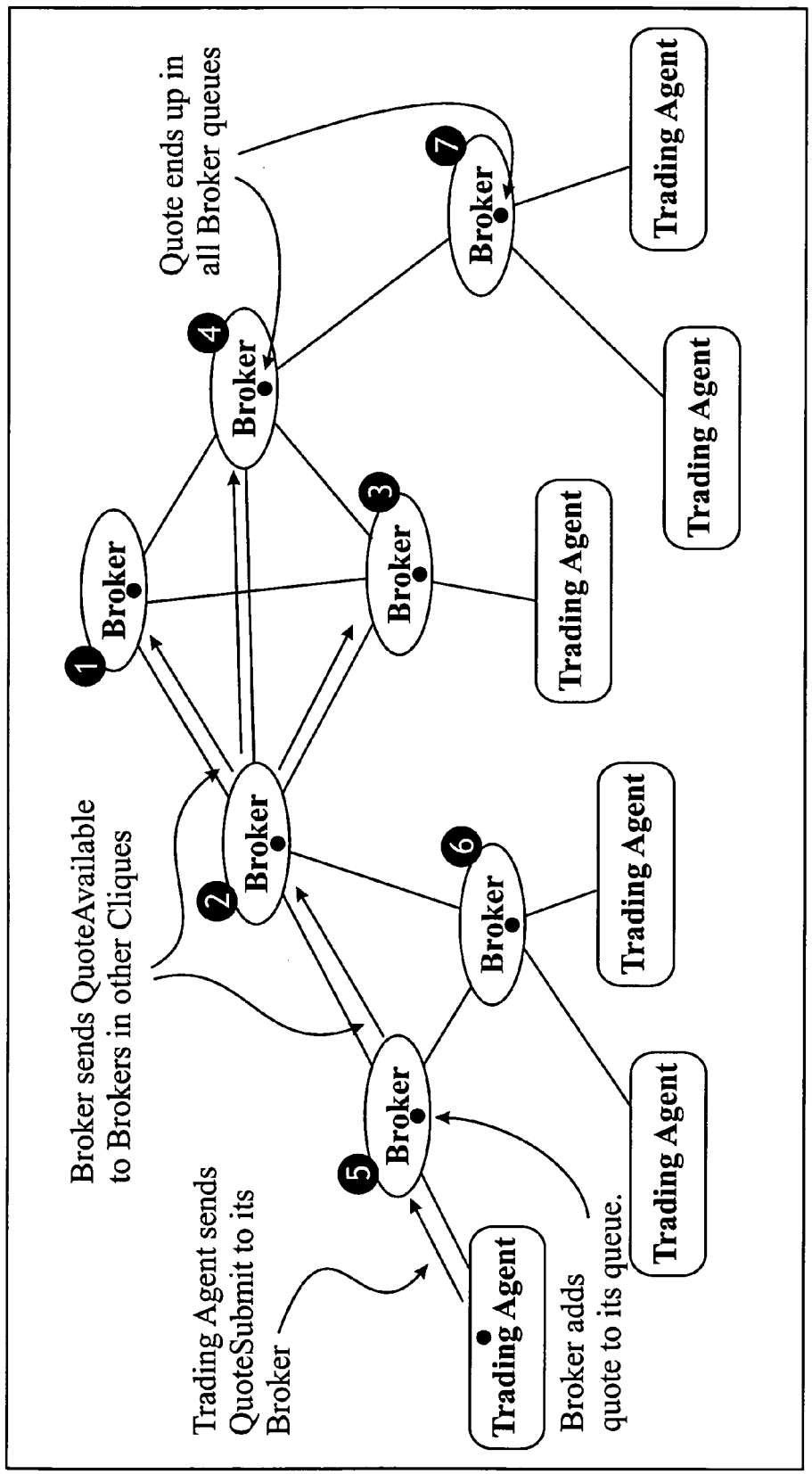
FIG. 2 shows the flow of messages in the system of FIG. 1 when a new quote is submitted in the system.

To understand the purpose of the distributed broker node arrangement, price distribution and deal execution will now be described with reference to FIG. 2.

The deal process begins with one or more traders submitting orders into trader terminals. An order is a dealing request from a trader, with instructions to buy or sell with specific restrictions, such as price and amount. A quote is a persistent order that remains available in the system and is distributed as part of the market price information. Quotes are used to "make the market", and are known to traders as bids or offers. A hit is an order that has "invisible" and "fill or kill" properties("invisible") Hits are not distributed as part of the market price. A hit does not remain in the system; if it can not be dealt when entered, it is removed.

An Order Book is a list of all the available orders in the market. Since the Quotes are the only available orders, the book consists of a list of Quotes. The Quotes are arranged in a queue in the correct dealing order. The sort order of the queue may vary for different trading instruments. The default sort order is by price and time. In the system, each Broker node maintains a complete list of all available quotes. In a system such as foreign exchange there will, effectively, be two books, one showing orders to buy and the other showing orders to sell.

The message flow in the system is described by named messages, each carrying appropriate parameters throughout the network. The process of submitting a quote (persistent order) begins when a Trading Agent receives information from a trader workstation that a trader has issued a bid or offer. The Trading Agent then starts the quote submission process. When the Trading Agent receives the quote information from the trader workstation, it will create and maintain a context for the quote. It will then send a Quote Submit message to the Broker node that it is connected to. The Broker node will validate the quote and accept it if valid. This first Broker node that receives the quote becomes the "owner" Broker node for this quote. In example shown in FIG. 2 this is Broker node 5. This is the only Broker node that can commit the quote to a deal. The Broker node will create a context or "quote object" and sort it into its queue for the correct tradable instrument.

After the quote is placed into its queue, the owner Broker node will then distribute the quote throughout the network by sending QuoteAvailable messages to other Broker nodes. In this example, Broker node 5 sends the QuoteAvailable message to Broker nodes 2 and 6. As each Broker node receives the message, it creates a context (quote object) and sorts it into its queue (order book). It notes in the context which Broker node had sent it the message. After placing it into the queue, the Broker node then sends the QuoteAvailable message on, using broadcast routing rules, to all neighbours except those in the same clique as the broker who sent the message. Therefore, Broker node 2 sends it to 1, 3 and 4. Broker node 4 then sends it to Broker node 7. At this point, all Broker nodes know about the quote, and update their order books accordingly.

The broadcast routing rules are applied to ensure that network traffic is handled in an efficient manner and to reduce any duplication of message flow.

The broadcast rules are:
1. The Broker node originating information will send it to all of its neighbour Broker nodes.
2. A Broker node receiving the information will send it to all of its neighbours Broker nodes except those in the same clique as the Broker node that sent the information.
3. If a message contains persistent information, such as a quote, the information will be stored with the identifier of the Broker node from which the information was received.

Note that these rules refer to the information, not the message that contains it. For example, information about a quote may be sent to one Broker node in a ProposeDeal message and to another Broker node in a MarketUpdate message. However, the same information is sent to both Broker nodes, and so the above rules apply.

Figure 3:
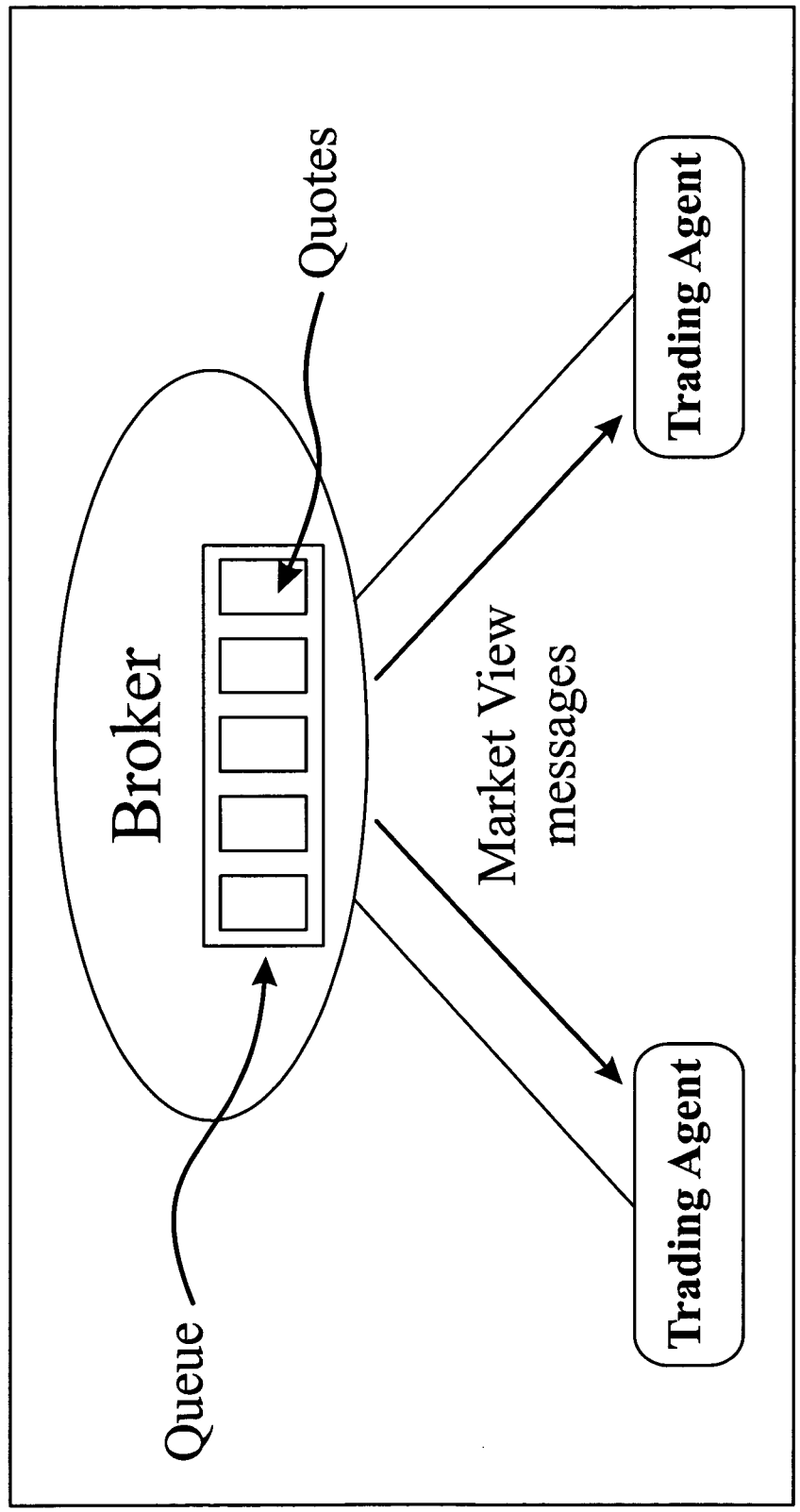
FIG. 3 depicts the production of a market view to traders in the system of FIG. 1.
Figure 4:
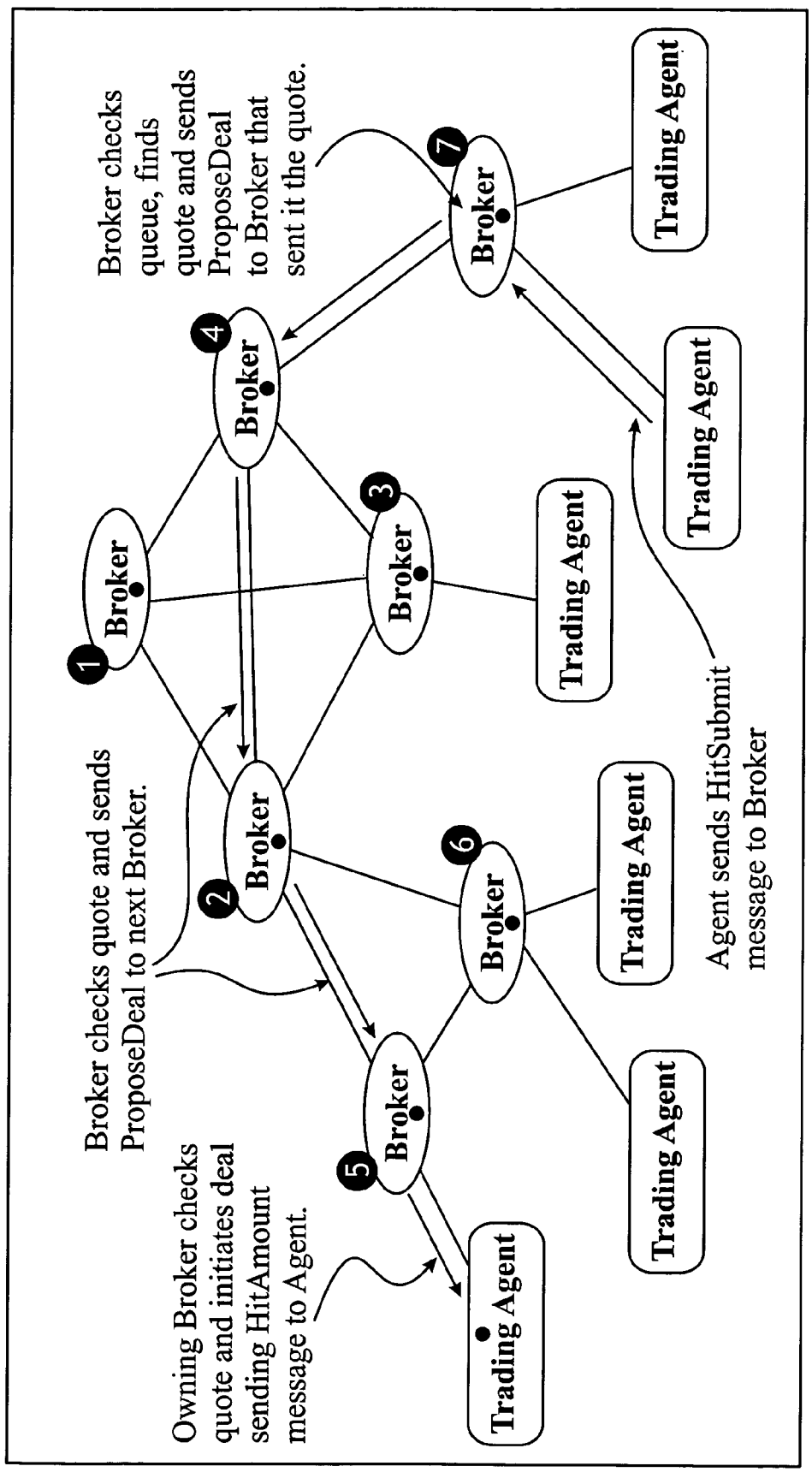
FIG. 4 shows the flow of messages in the system of FIG. 1 when a trader submits a buy or sell order.

Price distribution is the process of providing market information to the traders at the trader terminals. This information is created by the Broker nodes and sent to the Trading Agents for distribution to the traders. This process is shown in FIG. 3.

Each Broker node will examine its queue of quotes (order book) and calculate a view of the market for each Trading Agent connected to it. This view is built specifically for the trading floor that the agent represents. Views may be different based on credit or other factors. The exact process for determining a market view will vary based on the trading instrument. The view information is sent to the Trading Agent in a MarketView message. It follows, therefore, that each of the brokers hold credit information for each trader and the possible counterparties.

Hitting a quote is the basic process of creating a deal between two traders. A hit from one trader is matched to a quote from another trader. This process is shown in the FIG. 4. The Trading Agent of the trader terminal hitting a price shown on his market view display sends a HitSubmit message to the Broker node. This message targets a price, not a specific quote. The Broker node will scan its queue and find the first quote in the queue that can be matched with the hit. The matching rules may vary based on the trading instrument.

When the hit is matched to a quote, the Broker node will modify its context for the quote, moving the amount matched from "available" to "reserved pending deal". This will prevent the same amount of the quote to be matched with another hit. The Broker node will then send a ProposeDeal message to the Broker node from which it received the quote. This message will target the specific quote. In this example, the hit comes from a trader connected to a trading agent connected to broker 7. Broker 7 will send the message to Broker 4.

As each Broker node receives the ProposeDeal message, it checks the quote in its queue. If the amount of the proposed deal is still available in the queue, the Broker node performs a similar process as the matching Broker node. The amount of the proposed deal is moved from "available" to "reserved pending deal". The ProposeDeal message is then sent to the Broker node from which it received the quote. In the example, Broker node 4 sends it to Broker node 2. Broker node 2 will then send it to Broker node 5.

The routing of a ProposeDeal message follows targeted routing rules. Targeted routing is used to deliver information to a specific Broker node. Since knowledge of specific Broker nodes is not built into the system, the target is not a specific Broker node, but is the Broker node from which the information originated. For example, a message is not sent to "Broker node 714", but is sent as to "the Broker node originating quote 42". The targeted rules are:
1. A Broker node originating a message about a specific piece of information will send the message to the Broker node from which it received the original information.
2. A Broker node receiving a message about a specific piece of information that it did not originate, will send the message to the Broker node from which it received the original information.

The message will thus follow the path of the original information back to its source. In the example this is from Broker node 7, to Broker node 5, via Broker nodes 4 and 2.

When the Broker node that originally created the quote receives the ProposeDeal message, it performs the same checks and amount reservation as the other brokers. Since this Broker node owns the quote, it has the authority to commit the quote to a deal. The ProposeDeal message represents the authority to commit the hit to the deal. The Broker node will then initiate the deal process by sending a HitAmount message to the Trading Agent that submitted the quote. The deal execution process is described later.

Figure 5:
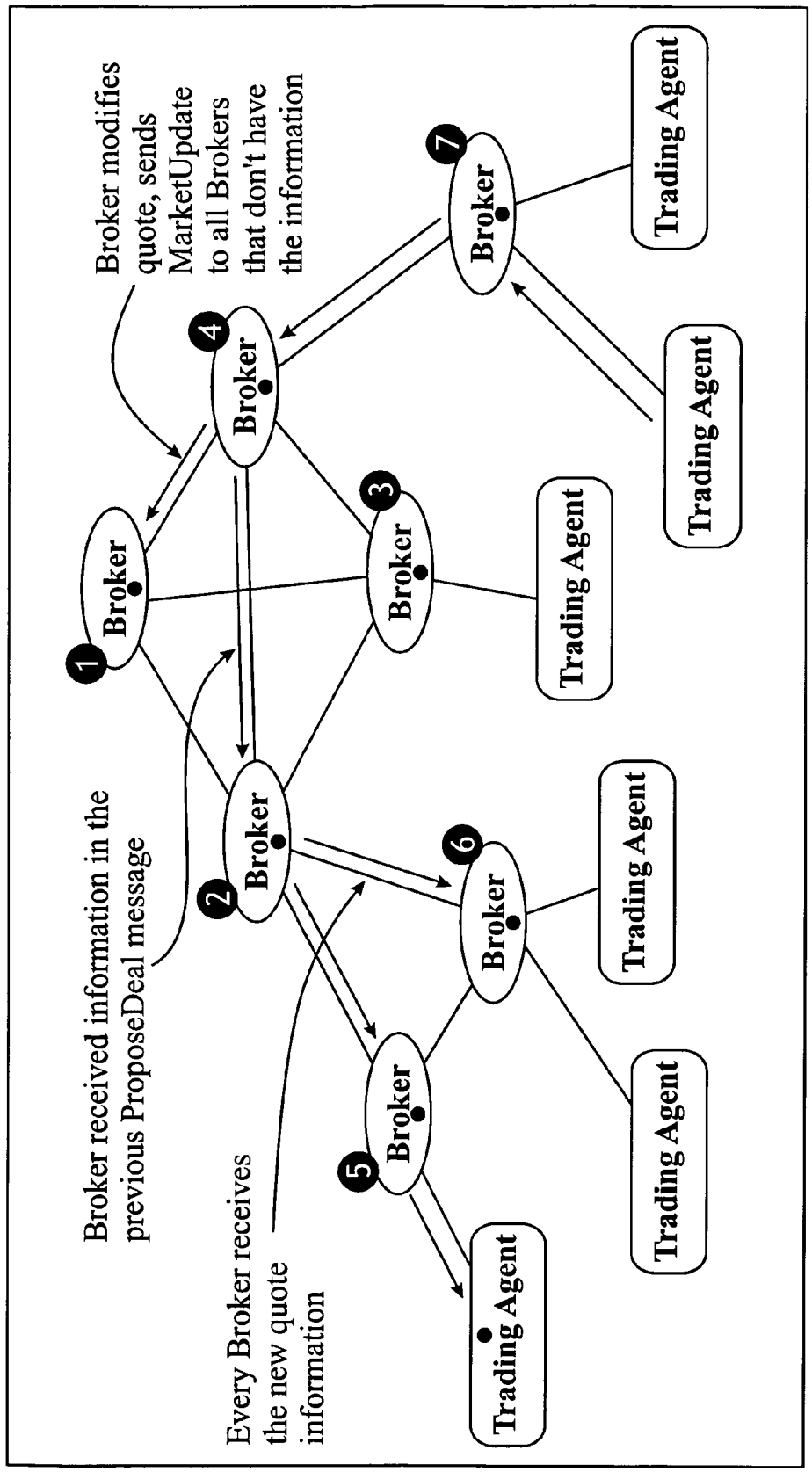
FIG. 5 shows the flow of messages to update broker nodes following a buy or sell order.

As the deal matching process takes place, it is necessary that the list of quotes maintained at each Broker node be keep up to date. This is accomplished by each Broker node notifying others when it makes a change to a quote, as shown in FIG. 5.

As each Broker node changes a quote in its queue, it notifies all neighbour Broker nodes except those in the clique from which it received the change. In the example above, Broker node 4 received notice of a change in a quote from Broker node 7 in a ProposeDeal message. It notifies Broker node 2 by sending the ProposeDeal message. Broker node 4 must now notify Broker nodes 1 and 3. This is done by sending a MarketUpdate message to these Broker nodes.

Following the normal routing rules, the information about the quote is distributed to each Broker node in the network. Any Broker node receiving the MarketUpdate message will pass it to all neighbours not in the clique from which it is received. Note that a Broker node sending a ProposeDeal message should not also send a MarketUpdate message to the same Broker node. This would result in duplicate information being received and the deal amount being reserved twice.

Figure 6:
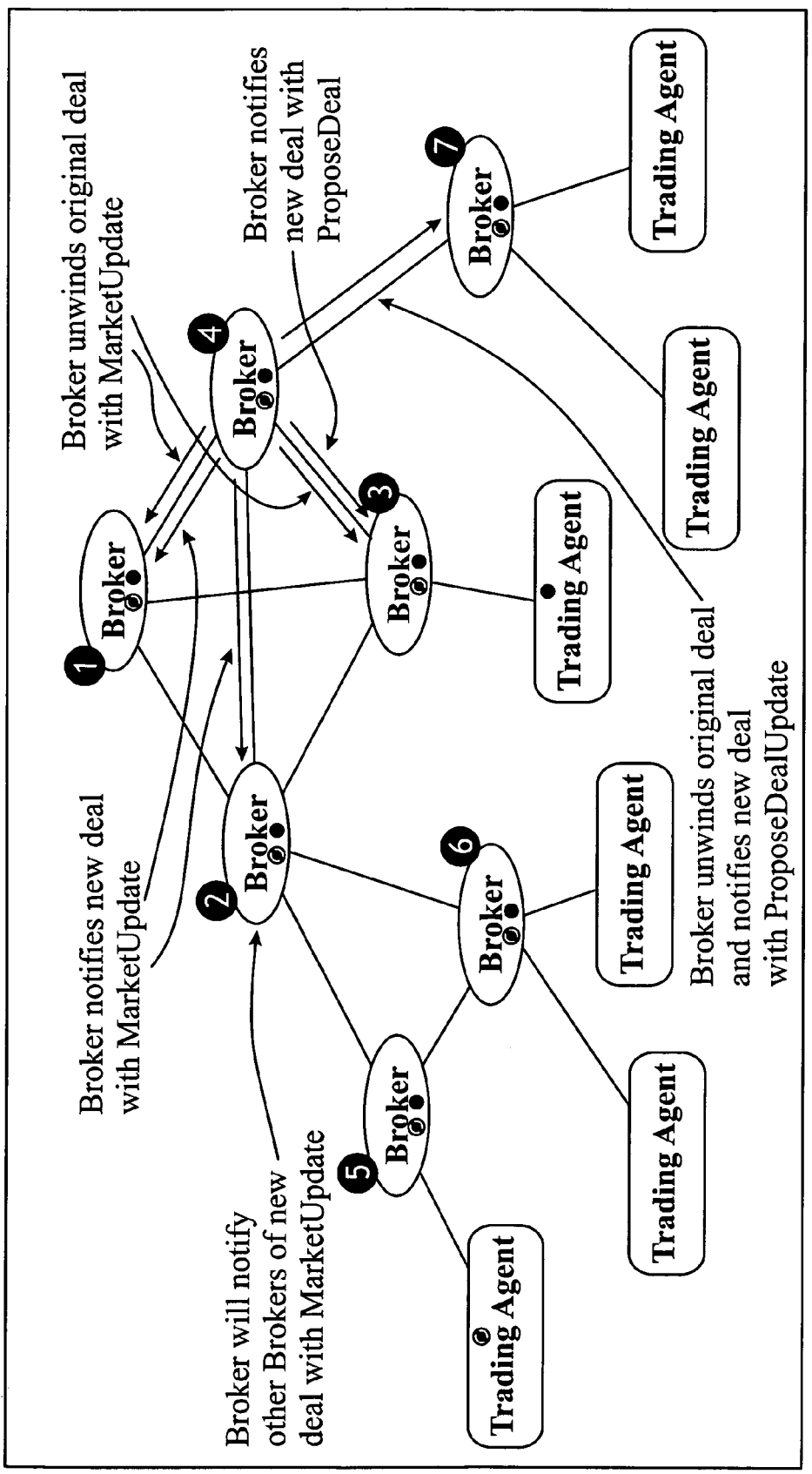
FIG. 6 shows the flow of messages when a broker modifies a quote.
Figure 7:
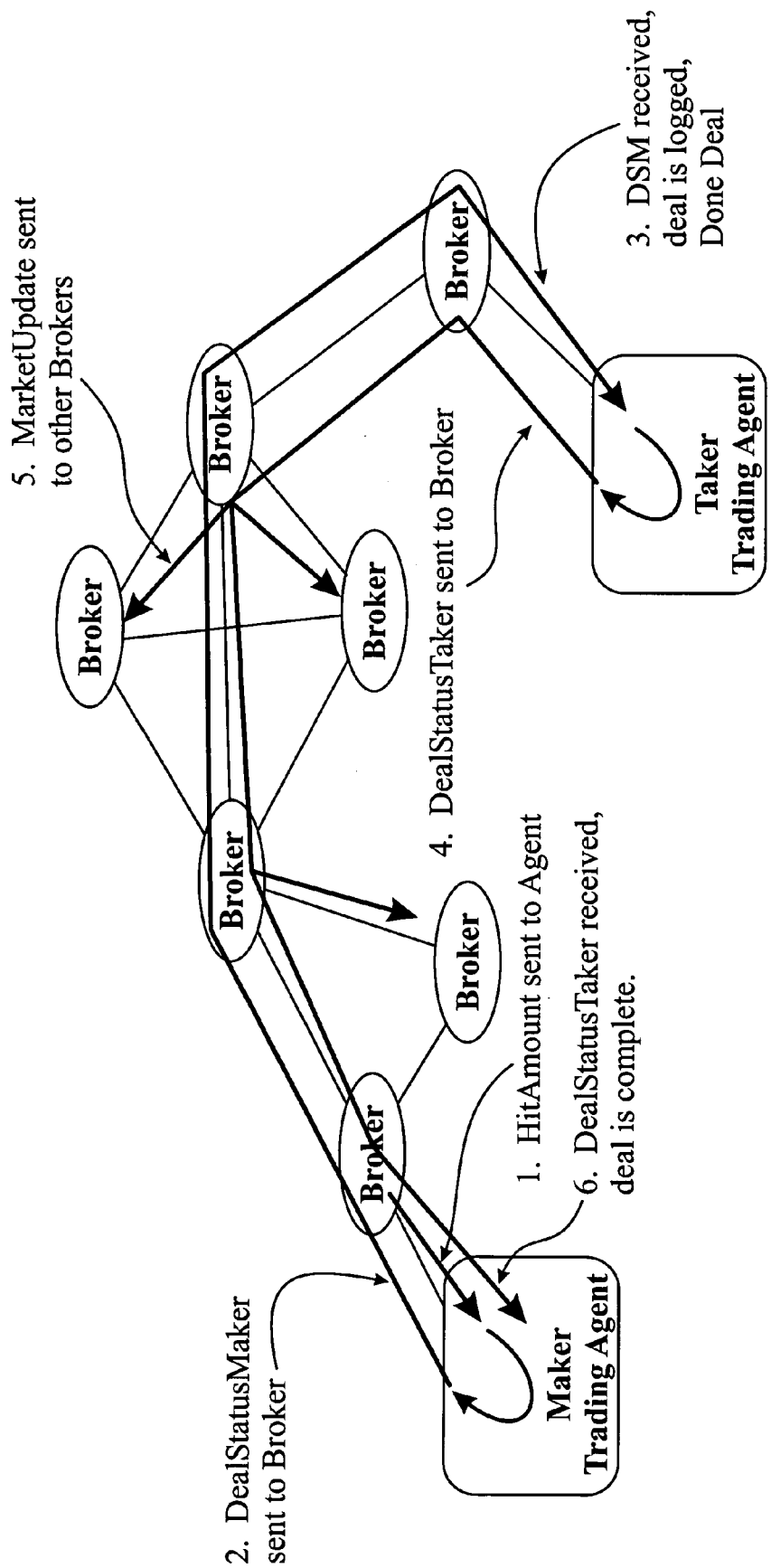
FIG. 7 shows the deal execution process.

When the deal matching process is completed, as described above, the deal execution process begins. This process completes the deal and commits the traders to a deal. The process is shown in FIG. 6. As matches are made and deals initiated, information is made available for traders. This information can be used to inform a trader that a deal is pending. Any given trading application can decide if the trader should be informed. In any case, the information is available.

The Taker's Trading Agent will be notified as soon as the initial match is made and the ProposeDeal message is sent. This agent can notify the traders workstation at this time. This pending deal information may change as the matching process continues. The maker workstation is notified of the pending deal when the maker's Trading Agent checks credit and sends the DealStatusMaker message.

The deal execution process begins when the maker's Trading Agent receives a HitAmount message from its Broker node. This message informs the Agent that a match was made for one of its quotes. The message identifies the quote as well as the amount of the hit, counterparty and the identity of the hit. The Agent will check with the trader workstation to make sure that the quote is still available. The Agent will send a HitAmountWS message to the workstation. The workstation will reply with a HitAmountWK message to show that the workstation is still working and that the trader did not interrupt the quote. At this point, the trader can no longer interrupt the deal.

The Trading Agent will next check for available credit with the counterparty. The credit check may allow the deal, reduce the amount of the deal or disallow the deal. The Agent will then reduce the available credit by the amount needed for the deal. This reduction in available credit may affect future deals. The maker's Trading Agent will now inform the taker's Trading Agent of the deal by sending a DealStatusMaker message to its Broker node. The message is targeted to the identity of the hit. The network Broker nodes will route the message to the owner Broker node of the hit, and that Broker node will deliver it to the taker's Agent. Once this message is sent, the maker's Agent knows that a deal may have been done, but the deal is in doubt pending a reply. The taker's Trading Agent completes the deal execution process. This part of the process takes place when the Agent receives the DealStatusMaker message from the maker. If the message shows a valid deal, the process continues.

The taker's Trading Agent will next check for available credit with the counterparty in a similar manner as the maker. The credit check may allow the deal, reduce the amount of the deal or disallow the deal. The Agent will then reduce the available credit by the amount needed for the deal. This reduction in available credit may affect future deals. It should be remembered that deals are unlikely to be rejected at this stage as prices shown to traders are pre-screened for credit. The taker's Trading Agent will now log the deal to its disk. As soon as the information is committed to persistent storage, the deal is done. Any checks on the deal status will now show a binding deal. The agent will now notify the trader, print a deal ticket and perform any other post deal processing. At this point, the deal is done but the maker doesn't yet know. As soon as the deal is done, the taker's Trading Agent will notify the maker by sending a DealStatusTaker message to its Broker node. This message is targeted to the quote and will be routed to the maker's Agent.

The DealStatusTaker message contains final information about the deal, and therefore the final changes to the quote. This information is used by the network Broker nodes and the Trading Agent. As the DealStatusTaker message is routed through the Broker nodes, each routing Broker node will use the information to update its quote context. The amount of the deal is moved from "reserved" to "complete". The portion not done is moved from "reserved" to "available" if the quote is still active. It will then notify other Broker nodes of the changes and of the deal by sending a MarketUpdate message to all other Broker nodes using network routing rules.

When the DealStatusTaker message gets to the owner Broker node of the quote, it will send it to the Trading Agent. The Agent will record the deal to disk. At this point the deal is no longer in doubt. The Agent will notify the trader, print a ticket and perform any other processing that is required. Some trading instruments may require additional information to be exchanged for a deal. An example of this is the settlement instructions for EBS spot F/X. This type of information is sent in a DealInformation message. After the deal is processed, the Agents can develop this information. The DealInformation message is sent to the Broker node. The network Broker nodes will then route the message to the other Agent where the information is processed as required by the instrument. A deal is thus completed.

Once the deal is complete, the two parties will know the identity of their respective counterparty for the first time. The identity will be displayed on their terminal screen and shown, for example, in a listing of deals performed in that trading session as well as printed on the deal ticket and logged to disk. Each of these comprises a means for identifying to each of the parties to an executed deal the counterparty to the deal.

The manner in which credit is handled in the system described will now be considered in more detail.

As mentioned previously, the system screens prices and matched deals using credit, as a result of which all prices shown to a dealer should be available for trading. It will be understood from the foregoing description that this requires each broker to have sufficient credit information to be able to make credit decisions. This is because the broker nodes are responsible for forming the market view which is distributed to communicating trading agents. The actual credit data is very complex and can vary by product and institution. For example, the concept of credit in an F/X trading system is straightforward as it is a spot market. However, for a product such as FRAs it is more complex as deals are done over a variety of time periods. In addition, some banks may prefer to assign credit to a counterparty over the whole of the range of their trading activities whereas some banks will prefer to assign credit to counterparties for a given financial instrument.

To simplify the process the system distributes and uses a simple subset of the credit data. Final credit authority remains with a node that has the full credit information. In the present system this will be the banks trading agent node but this is not mandatory and the invention is equally applicable to systems where credit is stored off site.

The system uses a single numeric value for each combination of trading floor, counterparty trading floor and tradable element. The purpose of the numerical value is to determine whether the two floors have credit to deal in a particular element. The meaning of the numerical value is specific to the instrument being traded. For example, spot F/X uses the value as a yes/no flag (1 or 0) whereas in Forward Rate Agreements (FRA) the value is used as a bit mask for FRABBDA/ISDA decisions. Other instruments will have other meanings. The credit is bi-lateral. Credit must exist between two floors for any dealing activity to take place. The credit check is made for a given trading element or pattern of trading elements as determined by the instrument. As the system is bilateral the broker will compare two credit values; that given by the first floor to the second and that given by the second floor to the first. If the values are compatible, the dealing operation is allowed. The meaning of compatible will be determined by the instrument. In terms of spot F/X if the amount proposed for the trade is lower or equal to the lowest of the two credit values the deal can proceed. Even if the deal is greater than the lowest credit value it may still proceed but only for a part of the proposed deal amount equal to the lowest credit value.

The full credit information for a trading floor is originated for a trading agent that has credit authority for a trading floor. This agent only has part of the total information; that relating to its own trading floor although it is possible that more that one trading floor is connected to a Trading Agent. When the credit information changes, the Trading Agent will sent a CreditUpdate message to its broker node. The broker will combine the information from the Agent into its total credit matrix and pass the message to neighbour brokers as a broadcast message following the rules set out earlier. Each broker will also store a record of from where the credit information for a given floor came from.

In the prior art system described in WO93/15467 the bank node holds the credit authority for a floor and is also responsible for dealing activity for the floor. The deal execution process described earlier is based on this credit model which is known as local credit.

During the deal execution the Trading Agent is presented with a potential deal. The Agent will examine the details of the deal and determine how much credit is required to complete the deal. It will check the available credit and, if it is insufficient, the Agent may reduce the amount of the deal or disallow the deal. The amount of credit actually needed (the whole or reduced amount) is reserved from the pool of available credit. This credit is not available for other deals. If this reduces the available credit for other deals below the dealing threshold the Agent will send a CreditUpdate message to notify the broker that credit is no longer available. If the reserved credit in due course becomes unreserved, the system may send a further CreditUpdate message to indicate that credit has become available.

When the deal is completed, the maker's Agent will be notified with a DealStatusTaker message. The Taker's Agent will then be aware of the completed deal. The Agent will then determine the credit that was actually used by the deal. This credit will be removed from the credit pool as consumed credit. Any remaining amount from the original reservation will be returned to the original pool.

As an alternative to local credit, a bank may adopt a Global Credit Model in which the Trading Agent that holds the credit authority for a floor is not the same Agent that performs the dealing activity for that floor. The Agent with credit authority may, but does not have to, perform dealing activity for a floor. This arrangement allows all the floors of an institution to share a common pool of credit and the creation of separate credit nodes within the network for some floors. The decision whether to adopt a global or local credit relationship is taken by participating banks and is external to the trading system. It is essential that the system can deal with any combination of local and global credit handling between counterparties. The various possibilities will now be described. In the following examples, Institution A is extending credit to Institution B.

EXAMPLE 1

Local-Global

Here Institution A operates under a local credit regime and Institution B under a global credit regime. Thus, each trading floors or Institution A must set a credit limit for deals with all floors in Institution B.

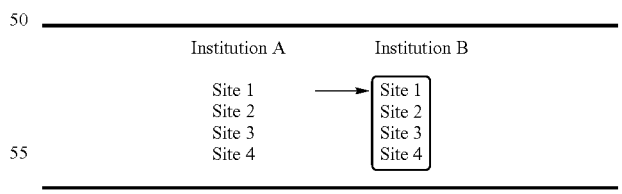

EXAMPLE 1

Local-Global

Local-Global relationships are common in the existing anonymous trading systems described previously, partly because of the limitations of those systems which require institutions to allocate credit limits between individual trading floors and each counterparty with which they want to trade. This has led to some banks allocating spot FX credit lines based on this grouping relationship to bring them into line with the inflexible requirements of the prior art systems. Other banks have set aside portions of their credit and allocated it using local-global credit purely for trading on anonymous systems. Such banks use other credit is relationships for their remaining operations.

EXAMPLE 2

Global-Global

In this model, Institution A extends credit for all its trading floors to all trading floors of Institution B. This means that the amount of trading any given floor of Institution A can do with Institution B is affected by the amount of trading with Institution B the other trading floors of Institution A have performed.

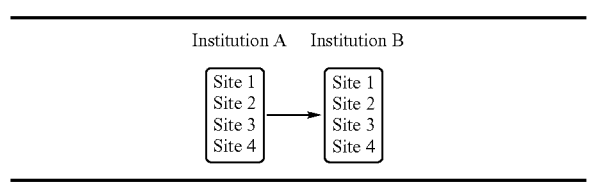

EXAMPLE 2

Global Global

Global-Global credit relationships are the most fundamental or basic type.

EXAMPLE 3

Global-Local

In this model, the whole of Institution A extends a combined line of credit to individual floors of Institution B. this may be appropriate where Institution A considers that Institution B is not uniformly trustworthy; there may be one particular trading floor with whom they are reluctant to extend large lines of credit. Alternatively, the country in which a trading floor is located may need to be considered as a special case or a trading floor may not have an appropriate legal status within Institution B.

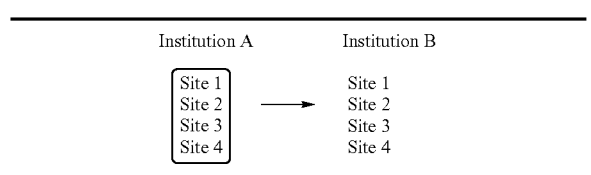

EXAMPLE 3

Global-Local

EXAMPLE 4

Local-Local

In some situations, Institution A may allow individual trading floors to extend lines of credit to individual trading floors of Institution B. this occurs for example, in emerging markets or exotic locations where trading is done solely from the branch of Institution A in that country to the branch of Institution B in that country. Typically, there is no other interaction between Institution A and these branches of Institution B.

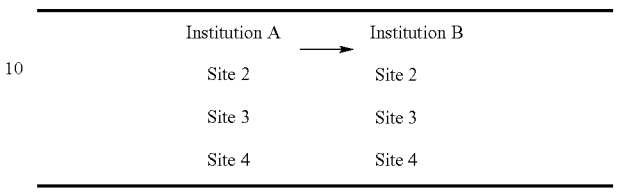

EXAMPLE 4

Local-Local

When setting credit limits with a counterparty, an institution must first define credit relationships and then allocate credit according to those relationships. These groupings may be done centrally. A typical credit grouping is as follows:

TABLE 1

|  | Institution B | | | |
|---|---|---|---|---|
| Institution A | SITE 1 | SITE 2 | SITE 3 | SITE 4 |
| Site 1 | 10 | 10 | | 10 |
| Site 2 | 10 | 10 | | 10 |
| Site 3, Site 4 | 12 | 15 | | 12 |

In table 1 above, Institution A has created three groups of its own sites and three groups of Institution B sites. The Institution A groups are:

| Group 1 | Site 1 |
|---|---|
| Group 2 | Site 2 |
| Group 3 | Sites 3 & 4 |

The Institution B groups are:

| Group 1 | Site 1 |
|---|---|
| Group 2 | Sites 2 & 3 |
| Group 3 | Site 4 |

The credit limits allocated are based on the group relationships. Thus, Group A3 extends $15M credit to Group B2 and $12M credit to Group B3. Table 1 may be written as follows:

TABLE 2

|  | B | | |
|---|---|---|---|
| A | Group 1 | Group 2 | Group 3 |
| Group 1 | 10 | 10 | 10 |
| Group 2 | 10 | 10 | 10 |
| Group 3 | 12 | 15 | 12 |

Thus, Groups A3 and B2 are made up of more than one trading floor and share single pools of credit. It will be appreciated that the group relationship shown is a hybrid of the local and global credit models. In the relationship between Institution A and Institution B, there may exist a plurality of local-global type relationships. Thus, Group A3 and Group B2 may represent all trading floors in major trading countries. The relationship between these groups is essentially Global-Global. On the other hand, the relationship between groups A1 and B1 or B4 is a local-local relationship, the relationship between groups A1 or A2 and B2 is local-global and the relationship between groups A3 and B1 or B3 is global-local. Other relationships are also present.

The above discussion refers to the relationship between Institutions A and B. A variety of relationships may also exist within the relationship between two Institutions. The flow of activity related to the creation of groups will depend on the following factors:

1. Grouping of the Institution sites; this may be done:
   a. Centrally—The Head Office defines all the groups for its sites or allows a proxy site to define the groups.
   b. Distributed—The Head Office defines certain main sites responsible for grouping themselves and other sites. For example, European sites may be grouped from London and US sites from New York. The authority for grouping sites may be based on geography and/or legal status. In a distributed system certain groupings may still be handled centrally. For example if given local centre may have permission to group all sites in a given geographical area with the exception of certain legal statuses which are handled centrally.
2. Authority is given for defining credit limits. This may be:
   a. Central
   b. Distributed.
   As in the grouping of the institution's own sites.
3. Counterparties must be grouped. Again, this may be done in the same manner as the institutions own sites are grouped. These three decisions need not be implemented in the same manner.

A fully Global-Global relationship can exist between two institutions. There all decision making is made centrally. In this case the credit grouping of tables 1 and 2 would be as follows:

TABLE 3

| A | B | | | |
|---|---|---|---|---|
|   | Site 1 | Site 2 | Site 3 | Site 4 |
| Site 1 HO |  | 99 |  |  |
| Site 2 |  |  |  |  |
| Site 3 |  |  |  |  |
| Site 4 |  |  |  |  |

It should be understood that the above discussion may relate to the manner in which banks allocate credit for a given financial instrument to be traded, for example, the allocation of credit for F/X spot trading. Depending on the nature of a given institution's own internal credit system, the credit relationship described may have to interface with the institution's credit limits for the instrument being traded over all possible methods including other anonymous systems, voice brokers and conversational dealing system. Additionally or alternatively, it may be required to interface with an institution's global credit mechanism which assigns credit to counterparty institutions across the range of its trading activities. Such a system is not confined to a single instrument but covers a range of instruments. Such systems are necessarily very complex as the notion of credit may vary where some instruments being traded require credit to be extended over long periods of time.

Referring back now to the handling of global credit within the system of FIGS. 1 to 7, it will be appreciated that the deal execution process for the global type of credit arrangement is more complicated than for the local credit example described earlier.

The relationship between institutions many not be pure and hybrids may exist. For example, table 4 below shows a mixed Global-Global and Global local relationship between two institutions.

TABLE 4

| A | B | | | Site 4 |
|---|---|---|---|---|
|   | Site 1 | Site 2 | Site 3 | Subsidiary |
| Site 1 HO |  | 50 |  | 10 |
| Site 2 |  |  |  |  |
| Site 3 |  |  |  |  |
| Site 4 |  |  |  |  |

In this arrangement the head office decides its own groupings, the counterparty groupings and the credit is line. However, one subsidiary of Institution B is accorded credit separately from the remainder of the institution.

In table five below, Institution A maintains a local-local relationship with a counterparty's floor, and still allocates credit for most of the counterparty's floors on a global basis. Thus, Site 1, the head office of Institution A decides its own grouping, the counterparty grouping and the credit lines form Sites 1 to 4 but Site 5, which may be an exotic location has a local-local relationship with Institution B site 4. Institution A Site 5 decides the credit line to Institution B, Site 4.

TABLE 5

| A | B | | | Site 4, Exotic |
|---|---|---|---|---|
|   | Site 1 | Site 2 | Site 3 | Loc x Branch |
| Site 1, HO |  | 50 |  | 0 |
| Site 2 |  |  |  |  |
| Site 3 |  |  |  |  |
| Site 4 |  |  |  |  |
| Site 5, Exotic Loc x Branch |  |  |  | 5 |

A local-global relationship may have different credit lines for each of its floors to the same global counterparty. This is not strictly a combination and is shown in Table 6 below. Site 1, the Head Office decides its own groupings, the counterparty groupings, but each Site administers the credit lines. (The lines themselves may be decided at the Head Office).

TABLE 6

| A | B | | | |
|---|---|---|---|---|
|   | Site 1 | Site 2 | Site 3 | Site 4 |
| Site 1, HO |  | 15 |  |  |
| Site 2 |  | 10 |  |  |
| Site 3 |  | 10 |  |  |
| Site 4 |  | 10 |  |  |
| Site 5, small branch |  | 5 |  |  |

Figure 8:
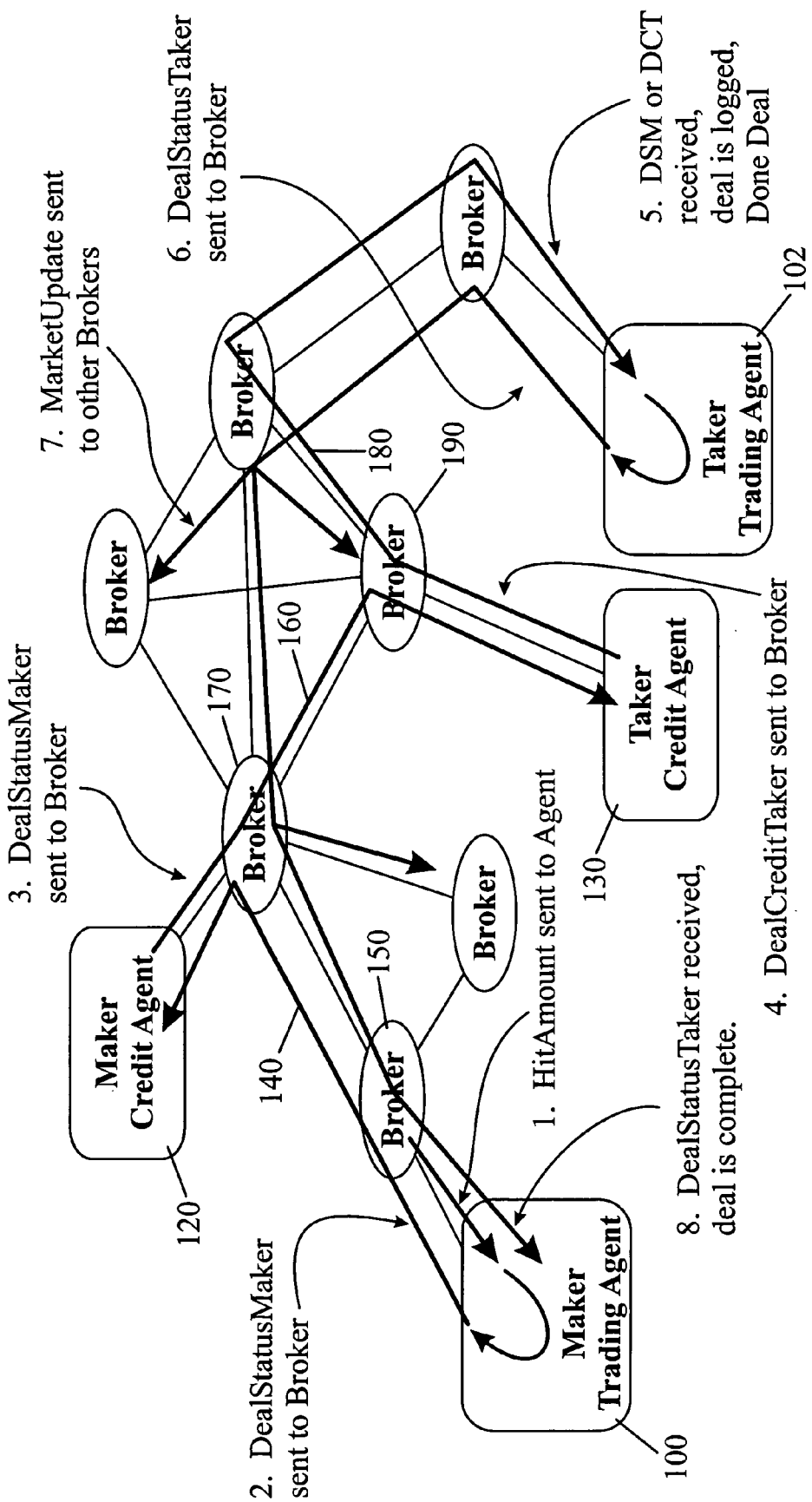
FIG. 8 shows the flow of messages in a global credit model.

FIG. 8 shows the credit message flow during deal execution with global credit.

The credit distribution process is the same as in the local credit example in that credit information is still distributed to all brokers. Each broker knows where the information came from and can route a message back to the Trading Agent with credit authority.

In the example of FIG. 8, the Maker and Taker Trading Agents 100, 102 do not have credit authority for their floors. Credit must therefore be confirmed by the two Credit Agents 120, 130 which do have that authority and which may be referred to as Maker and Taker Credit Agents.

When the Maker Trading Agent 100 processes a deal it will first check that the quote is still available in the manner described previously and it notifies the dealer of the pending deal. However, it cannot check the credit position itself and so does not send the DealStatusMaker message itself. Instead, a DealCreditMaker message 140 is sent to the broker 150 to which the Trading Agent is attached. The broker 150 routes the DealCreditMaker message 140 to the Maker Credit Agent 120, which is the source of credit information for the trading floor to which the Trading Agent 100 is performing the dealing activity. Once the Maker Credit Agent 120 has performed the credit check as described previously, it sends the DealStatusMaker message 160 to broker 170.

The DealStatusMaker message 160 is routed by the broker 170 not to the Taker Trading Agent but to the source of credit for the taker, in this case the two are not the same and the DealStatusMaker message is routed to the Taker Credit Agent 130. The Taker Credit Agent 130 then performs credit checking as described previously and sends a DealCreditTaker message 180 to the broker 190 to which the Taker Credit Agent is connected. If the Taker Trading Agent has credit information for the trading floor the DealCreditTaker message 180 is not necessary.

The DealCreditTaker message 180 is routed by the broker network to the source of the original hit using the targeted routing rules described previously.

When the Trading Agent 110 that originally proposed the deal receives the DealCreditTaker message 180 the deal is done and logged at the Taker Trading Agent and the deal execution process carries on as described earlier with respect to FIG. 6.

The Maker and Taker Credit Agents 120, 130 perform credit reservation in the same manner as described in the local credit example. The Maker Credit Agent reserves credit when it receives the DealCreditMaker message and the Taker Credit Agent reserves the credit when it receives the DealStatusMaker message 160. Credit consumption is then performed when the Maker and Taker Credit Agents 120, 130 receive the DealStatusTaker message 180 from the Taker Trading Agent 102.

It may be desired for more than one Trading Agent to hold the credit authority for a floor to increase reliability and performance. In such a case, any one such Credit Agent may confirm a deal. It is the responsibility of those Agents to communicate and keep the credit pool correct between themselves. This process is specific to an instrument or institution. Each broker will receive multiple CreditUpdate messages for the same floor. The brokers must decide which message to accept. The broker will examine a "hop count" in the message to determine which message came from the closest source. The message with the higher hop count is not processed and is not routed.

The Credit Agent for a floor or institution has to maintain the pool of available credit and adjust the credit information as credit is used and restored. The manner in which this is done is specific both to the institution and the instrument being traded.

One reason for a bank adopting a global approach to credit is to increase the flexibility available in trading. If a bank comprises several floors each of which have a preassigned amount of credit with various counterparties, a situation can arise in which some of the floor trade up to their credit limits but others do not. Those floors which went up to their limits would have liked access to the unused credit on the other floors to maximise trading within the bank's overall trading limit with a given party. That overall trading limit may not be confined to a single trading instrument but cover the range of the bank's activities, some of which may be traded on anonymous electronic systems and others of which may not.

It will be appreciated that the system described allows any combination of local-global type credit relationships to be used. This enables institutions to assign credit to operations using anonymous trading systems in the same manner as they do other trading operations. This enables a more flexible approach to credit to be adopted, where appropriate, compared to prior art systems. This in turn allows institutions more chance of trading up to their credit limits and so maximising their profits from trading activities.

The credit limit relationship has been described with specific reference to a system using a network of broker nodes. It is to be understood that this aspect of the invention is equally applicable to any system which requires the allocation of bilateral credit limits between parties, including the systems described in EP-A-0,399,850, EP-A-0,406,026, EP-A-0,411,748 and WO93/15467 referred to previously.

Figure 9:
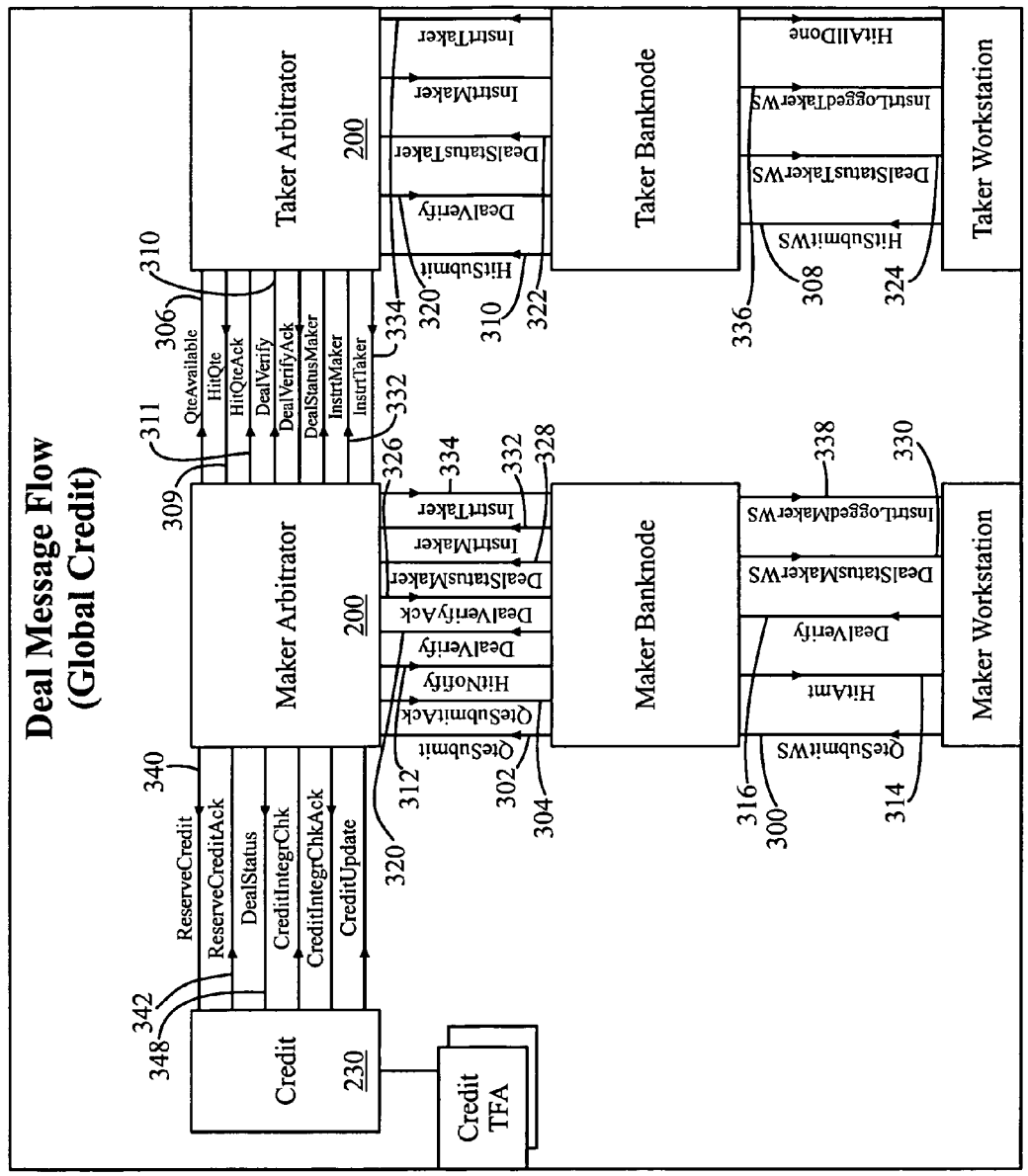
FIG. 9 shows the schematic architecture of a portion of a trading system embodying the second aspect of the invention.
Figure 10:
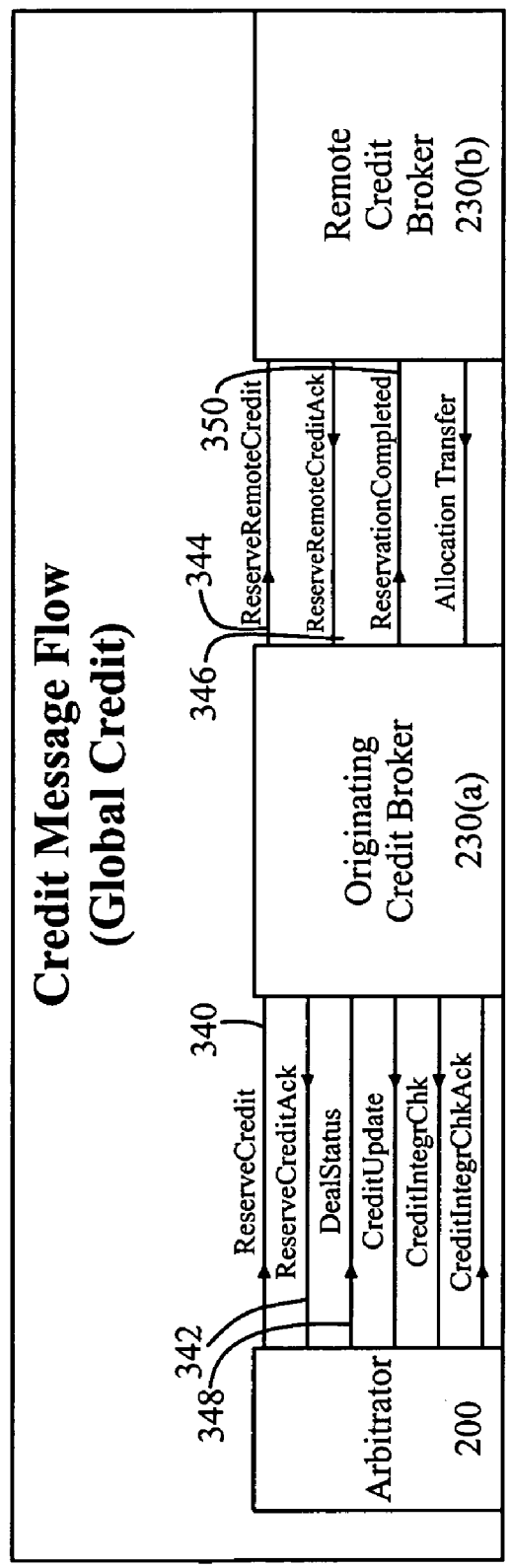
FIG. 10 shows the use of a further credit broker in the system of FIG. 9.
Figure 11:
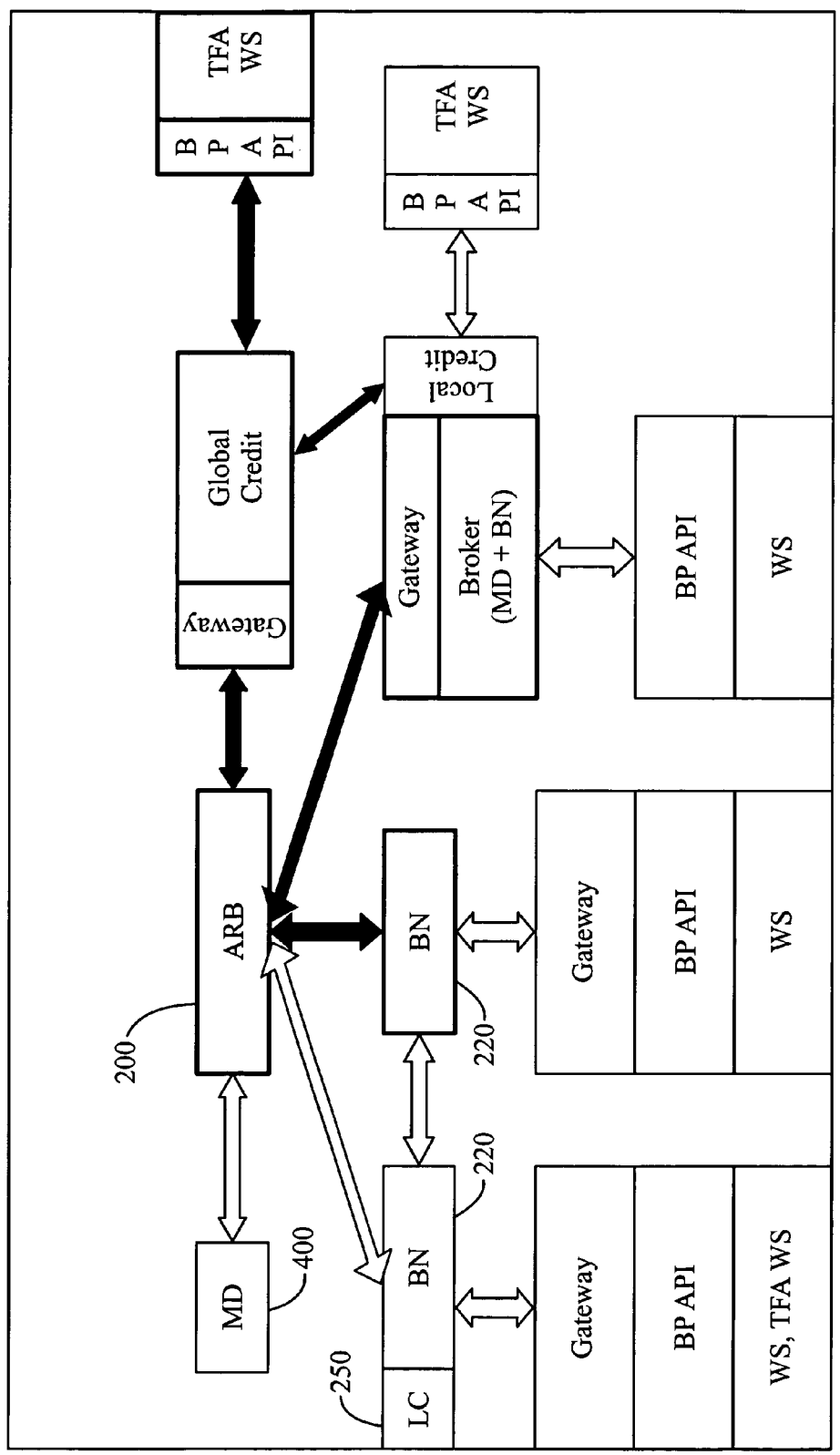
FIG. 11 shows a hybrid system using a combination of arbitrators, broking nodes, global and local credit.

FIGS. 9 to 11 show a second embodiment of the invention. In the embodiment described above, credit agents are used by each trading floor to handle credit limits when credit is treated on a global basis. This arrangement suffers from potential performance disadvantages as additional messaging and separate computers are required to accommodate credit reservation. For a deal to be done, a minimum of four computers; two trading agents and two credit agents are required to communicate which can greatly increase deal completion time.

This situation is avoided by allocating one or more credit brokers with the matching engines. The credit brokers perform credit reservation for institutions that are configured for global credit and, unlike the previous embodiment, can credit check both sides to a deal.

FIG. 9 shows how the present applicant's existing legacy system may be modified to include a credit broker. The existing system is described fully in WO93/15467 to which reference should be made. Matching and deal execution is performed by one of three arbitrators 200 which are geographically distributed around the world with one located in New York, one in London and one in Tokyo. The arbitrators 200 are connected to market distributors 210 which prepare market views for distribution to trading floors 220 via bank nodes. The actual market view for a given trading floor depends on their credit limits with various counterparties with quotes in the system.

The credit broker 230 is placed next to the arbitrator, there being one credit broker 230 for each arbitrator 200. The credit brokers are connected to the arbitrators by a fast local area network to minimise the impact on deal completion time.

In the present system described in WO93/15467, any of the three arbitrators can be active in completing a deal. It is desirable that the credit broker that holds credit information for a given bank is closest to the arbitrator that initiates the deal. This may be achieved by a predictive algorithm that allows credit information to migrate to the most active arbitrator. Thus, credit details are not fixed for a given institution in one of the credit brokers but move around. In practice, during the course of a day, the position of the most active arbitrator will change as different markets open and close.

Each credit broker provides its local arbitrator with the same credit information that is provided by the trading floor's bank node in the system of WO93/15467. The credit broker provides credit information for all floors participating in global credit. As credit allocations are fully utilised or modified by credit administrators, new credit information is provided to the arbitrator.

FIG. 9 shows the various message flows in the deal completion and credit reservation process. Considering the deal reservation first, when a bid or offer is submitted by a maker workstation 240, that workstation sends a QteSubmitWS message 300, to its bank node 220. This message is the submission of a quote into the anonymous trading system by the maker. The bank node validates the quote, creates a quote context in the quote list and sends the quote to the arbitrator in a QteSubmit message 302.

The maker arbitrator 200 validates the quote and sends an acknowledgement message QteSubmitAck 304 to the maker's bank node which either accepts or rejects the quote. A quote may be rejected, for example, if some detail such as the quote amount is missing.

When the QteSubmitAck message 302 is received at the maker's bank node, that node checks whether the quote has been rejected. If it has it sends a QteCxredWS message (not shown) to the maker's workstation and a QteInterrupted message to the arbitrator. It then removes the quote context from the quote list.

If the quote is accepted by the arbitrator, the maker arbitrator sends a QteAvailable message 306 to all local market distributors (not shown) and all other arbitrators. At this point the quote becomes available as the target of sell requests from local makers or hits from other arbitrators or may participate in an automatch in which the arbitrator automatically performs a match with another quote in the system.

When a taker wants to hit the maker's quote, which is displayed to him on his workstation screen, his workstation sends a WN_HitSubmitWS message 308 to its bank node. The bank node, in response, sends a NA_HitSubmit message 310 to its arbitrator 200. The taker arbitrator passes this HitSubmit message to the maker arbitrator as a HitQte message 309 which is acknowledged by the arbitrator in a HitQteAck message 311.

The arbitrator then selects a compatible quote, generates a unique deal identifier and sends a AN_HitNotify message 312 to the maker bank node. This may be in response to the specific hit by the taker or the result of an automatch of a quote submitted by the taker. At the same time the maker arbitrator 200 initiates credit reservation with the credit broker on behalf of both the maker and the taker bank nodes. It is important to understand that the credit broker handles credit for both sides of the deal in contrast to the credit agents of the previous embodiment.

The maker's bank node then sends a NW_HitAmt 314 message to the maker's workstation confirming the existence of the quote involved in the deal. If the quote has not been interrupted by the trader, the trader is notified of the pending deal and can no longer interrupt the portion of the quote involved in the pending deal. The makers workstation sends a WN_HitAmtAck message 316 back to the bank node to acknowledge the hit amount message. If the quote had been interrupted, the bank node would cancel the deal and send a NA_Dealfailed message (not shown) back to the arbitrator.

Assuming that the quote has not been interrupted, the maker's bank node logs the pending deal in a Traders Database as an Assign record and shows the deal status as being "in doubt". The bank node then sends a DealVerify message 320 to its arbitrator 200 to confirm the deal.

The arbitrator, which earlier commenced credit reservation, waits for the result of credit reservation. Once that is received from the credit broker 230, the DealVerify message 320 is forwarded to the taker arbitrator 200 with the deal amount. This may not be the full deal amount if there is only sufficient credit for a portion of the deal to be completed. The Deal Verify message is forwarded to the taker bank node which creates a context for the deal in its pending deal list. It then logs the deal in its Trades Database and creates a Trade record with the deal status confirmed. A unique ticket number is assigned to the deal and a deal audit is generated for the deal. The taker bank node then sends a NA_DealStatusTaker message 322 to the taker arbitrator and sends a NW_DealStatusWS_Taker message 324 to the taker workstation with the final deal amount.

The taker arbitrator then sends a DealVerifyAck message 326 to the maker arbitrator to acknowledge receipt of the DealVerify message 320. The maker arbitrator passes the acknowledgement message to the maker bank node. On receipt of this message, the maker's bank node changes the deal status in its Trade Database to "committed" and assigns a ticket number to the deal. It then sends a NA_DealStatusMaker message 328 to the arbitrator and a NW-DealStatusWSMaker message 330 to the maker's workstation with the final deal amount. These two messages confirm the change in deal status to the maker workstation and the arbitrator.

The maker's bank node then sends an InstrtMaker message 332 to its arbitrator. This message contains settlement instructions. The message is forwarded to the taker's arbitrator and then to the taker's bank node where the settlement instructions are logged in the Trade Database. The deal status is changed to "settled". A sequence number is assigned to the deal and a deal ticket printed. The taker's bank node then sends an InstrtTaker message 334 to its arbitrator which contains the taker's settlement instructions. This message is forwarded to the maker's bank node via the two arbitrators. The takers bank node also sends a NW-LoggedWSTaker message 336 to the taker's workstation completing the deal and informing the trader that the deal has been logged.

On receipt of the InstrtTaker message at the maker bank node, the settlement instructions are logged in the Trade Database and the deal status changed to "settled". As with the taker bank node a sequence number is assigned and a deal ticket is printed. The maker bank node then sends a NW_InstrtLoggedWSMaker message 338 to the maker's workstation to complete the deal.

The following description concerns the operation of the credit broker during the deal execution process described above.

In the foregoing description, the maker's arbitrator initiates credit reservation when the AN_HitNotify message is sent to the maker bank node. This credit reservation is performed only when one of the parties to the deal participates in global credit. In that case, the maker arbitrator sends a AC_ReserveCredit message 340 to the credit broker 210. This reserve credit message contains a deal identifier, the amount of the pending deal, a currency pair identifier, if the trade is in FX spot, or some other instrument identifier if not, and the identities of the maker and taker trading floors. The latter are known as the "floor keys".

If the maker's trading floor participates in global credit, the credit check at the credit broker continues otherwise the credit reservation for the maker is marked with a status of "maker-in-doubt" to complete maker side credit checking and the credit check continues for the taker.

Assuming that the maker participates in global credit, the credit broker first resolves the grantor group containing the maker's floor. The grantee group is resolved from the grantee group using the taker's floor key. This provides the allocation to be utilised for the pending deal. The deal amount is converted to credit utilisation in terms of the credit limit currency associated with the allocation.

The total credit available in the given allocation is compared to the amount needed for the deal. If sufficient credit for a minimum deal size is not available the reservation process stops and a CA_ReserveCreditAck message 342 is sent to the arbitrator indicating that available credit has been exhausted.

If the credit broker is also processing the reservation for the taker, this is if the taker's institution is participating in global credit, the maker's credit is released prior to sending the message. If there is sufficient credit, but only for an amount less than that of the proposed deal. The amount of the deal and the reservation is reduced.

If there is sufficient total credit available, the broker determines if sufficient credit is physically present on the local credit broker to complete the reservation. If it is, the broker adds the utilisation amount for the deal to the total utilisation against the given allocation and marks the CA_ReserveCreditAck message 342 as maker reserved with the deal amount. Its credit broker then processes the taker credit in the same manner.

If sufficient total credit is available but the credit broker does not have credit allocation physically at the local credit broker, it must ask the appropriate remote credit broker to complete the reservation. This is done by sending a CC_ReserveRemoteCredit message 344 to the credit broker believed to have the physical allocation. This message contains a request number, the grantor and grantee floor key, and allocation identifier, and the reservation amount. The situation involving two credit brokers is shown in FIG. 10 in which the maker arbitrator is shown at 200 and the originating credit broker, that is the credit broker of FIG. 9 is shown as 230(a). The second credit broker is shown as 230(b). Its associated arbitrator is not shown.

The credit broker who receives the CC_ReserveRemoteCredit message 344 will check its local allocation. If it can accommodate the reservation the amount is reserved. If not, the receiving credit broker checks the total credit available and either denies the request with a CC_ReserveRemoteCreditAck message 346 indicating the request failed, or forwards the request to the third credit broker. It will be recalled that in the system based on the architecture of WO93/15467 there are three credit brokers, one for each arbitrator.

If the CC_ReserveRemoteCreditAck message 346 received by the originating credit broker indicates that the credit was reserved, it processes the taker's side of the reservation. If this is completed successfully, a CA_ReserveCreditAck message 342 is sent to the requesting arbitrator 200 indicating the amount successfully reserved for the pending deal.

It is necessary that the arbitrator informs the credit broker 210 when a deal has been verified. This enables the credit broker to finalise the reservation amount and to inform the remote credit broker, if one is involved, that an allocation has been utilised. This is achieved with an AC-DealStatus message 348 from the arbitrator to the credit broker. The deal status message advises the credit broker of the final status of the deal. If the deal failed, the credit reservation is undone. If it succeeded, the remote credit broker or brokers, if there are any, are informed of the credit utilisation via a CC_Reservation_Completed message 350 which includes an allocation identifier and the amount confirmed against the allocation. This enables the credit brokers to maintain an accurate view of total allocation availability.

When the remote credit broker 230(b) receives the reservation completed message 350, it will decide whether any locally held allocations should be transferred to another credit broker. This decision is based on the number of reservation requests recently processed by each credit broker, the total allocation available, and the local allocation available at each credit broker. If one broker decides to transfer allocation to another, it sends a CFC_AllocationTransfer message 352 to all credit brokers. This message contains both the granting and receiving broker identities as well as the amount that has been transferred. With this message, allocation is transferred to where it is needed most, while allowing the brokers to maintain an accurate view of where the available allocations reside. It will be appreciated that it reduces the number of messages required to perform credit checking and also ensures that the credit checking takes place close to the arbitrator handing the deal. Both the factors help to speed up the deal completion process.

The preceding description, with reference to FIGS. 9 and 10 has described how global credit or a global/local, local/global credit regime may be introduced into the architecture of WO93/15467. However, the principle described is applicable to any anonymous trading system where credit checking is required. For example it is equally applicable to the broking node type distributed system of FIGS. 1 to 7 or to a hybrid system which combines arbitrators and broking nodes.

FIG. 11 illustrates a hybrid model in which the arbitrator 200 is retained with a market distributor 40 and a number of interconnected bank nodes 220 each operating a local credit regime LC 250.

The trader workstation WS and Trading floor administrator workstations TFA WS communicate with the bank nodes through a broking platform API. This allows trading floor administrators to vary the credit limits that are stored at the credit broker. A broker, of the type described with reference to FIGS. 1 to 7 is also coupled to the arbitrator. The broker performs the functions previously handled by the bank node and the market distributor including distributing credit filtered market views to the trader workstations. The broking node communicates with the arbitrator through a gateway and the workstation communicate with the broking node via a broking platform AP. The broking node may include a local credit module which communicates with the credit broker where a deal is conducted with one side using global credit and the other side using local credit. The local credit module is accessible by trading floor administrators workstations TFA WS so that administrators can vary the stored credit limits.

In the pure broking node implementation, the architecture is as shown in FIGS. 1 to 7 except that the functions of credit broker is included in each of the broking nodes. Thus, using the analogy of the architecture of WO93/15467, each broking node performs the functionality of the bank node, market distributor, arbitrator, including deal matching and execution, and global credit broker. The brokers are interconnected using the clique tree structure described previously and the trader workstations are connected to the broking nodes through the broking platform API.

It will be appreciated that in the foregoing discussion, local credit need not refer simply to credit assigned to a single trading floor but may include regional credit, in which credit is assigned to a number of trading floors, for example, covering one geographical region. Similarly, the concept of a global credit need not refer strictly to the ultimate highest point in an institution's hierarchy but could be regional. As an example global credit could refer to an institution's European trading with individual trading floors in each country being treated as local credit levels.

Various other modifications and alternative arrangements to those described are possible and will occur to those skilled in the art. Such variations and modifications are all within the spirit and scope of the invention which is defined solely by the claims appended hereto.

What is claimed is:

1. An anonymous trading system for anonymous trading of financial instruments between traders, the system comprising:
   a computer communications network for transmitting electronic messages;
   a plurality of trader terminals grouped into a plurality of trading floors each trader terminal in a trading floor being connected to the computer communications network and being arranged to generate electronic order messages including quote messages and/or hit messages, each quote message comprising a bid or an offer, each hit message comprising a bid or offer, and to display to a trader order information received from other trader terminals over the network;
   a plurality of trading agents, each trading agent being connected to the communications network for communication with one of the trading floors;
   a plurality of broking nodes, each broking node being connected to the communications network, each trading agent being arranged td communicate with at least one broking node, each broking node comprising:
      order storage means for storing received quotes in a bid quote queue and an offer quote queue;
      a matching engine for matching bid and offer orders input into the system from the trader terminals and for assisting in executing deals where orders are matched;
      price distribution means for providing market information to the trader terminals of the trading floor or trading floors to which the broking node is connected via a trading agent;
      credit storage means for storing credit information for the trading floor or trading floors to which the broking node is connected via a trading agent; and
      market view distribution means for providing a market view to each trader terminal in the trading floor or trading floors to which the broking node is connected via a trading agent, the market view being screened in accordance with the credit information for that trading floor, such that the market view for trader terminals in a given trading floor comprises only quotes from trader terminals in other trading floors with which the given trading floor can execute a deal;
   wherein a plurality of trading floors extends a single pool of credit to other pluralities of trading floors, and
   the system further comprises a credit limit agent for each plurality of trading floors for storing credit limits available for trades between that plurality of trading floors and counterparty pluralities of trading floors, and for updating the credit information in the broking nodes of that plurality of trading floors.

2. An anonymous trading system for trading instruments between traders, the system comprising:
   a communications network for transmitting electronic messages;
   a plurality of trader terminals, each trader terminal being connected to the communications network and being arranged to generate electronic order messages including quotes and/or hits in the form of bid and/or offer messages and to display to a trader order information received from other trader terminals over the network;
   a plurality of trading agents, each trading agent being connected to the communications network for communication with two or more of the plurality of trader terminals,
   a plurality of broking nodes, each broking node being connected to the communications network, each trading agent being connected to at least one broking node, each broking node comprising:
      order storage means for storing received quotes in a quote queue;
      a matching engine for matching bid and offer orders input into the system from the trader terminals and for assisting in executing deals where orders are matched;
      price distribution means for providing market information to the trader terminals;
      credit storage means for storing credit information; and
      market view distribution means for providing a market view to trader terminals, the market view being screened in accordance with the credit information such that the market view comprises only quotes received from other trader terminals with which the trader terminals can execute a deal;
   wherein each plurality of groups of trading terminals extends a single pool of credit to other pluralities of groups of trader terminals, and
   the system further comprises a credit agent for each plurality of groups of trade terminals for storing credit limits available for trades between that plurality of groups of trader terminals and counterparty pluralities of groups of trader terminals, and for updating the credit information in the Poking nodes of that plurality of groups of trader terminals.

3. A trading system according to claim 2, wherein each group of trader terminals comprises a trading floor.

4. A trading system according to claim 2, wherein the credit agent for each plurality of groups of trader terminals is also a trading agent.

5. A trading. system according to claim 2, wherein each credit agent includes means for receiving credit enquiry messages from trading agents, means for checking available credit, and means for indicating whether a deal can proceed.

6. A trading system according to claim 2, further comprising a second credit agent for each plurality of groups of trader terminals for storing credit limits in cooperation with the first credit agent.

7. A trading system according to claim 2, wherein each trading agent is arranged, for the trader terminals with which it is arranged to communicate to complete deals, produce deal tickets and maintain deal information for traders.

8. A trading system according to claim 2, wherein the quote queue maintained by each broking node comprises a bid quote queue and an offer quote queue and the broking node is arranged to order received quotes in the quote queues in order of price and time.

9. A trading system according to claim 2, wherein the credit information stored in the broking node credit storage means comprises an indication of whether that plurality of groups of trader terminals has non-zero credit available for trades with counterparty pluralities of groups of trader terminals.

10. A method of executing a deal over an anonymous trading system for anonymous trading of financial instruments between traders that includes a computer communications network for transmitting electronic messages; a plurality of trader terminals grouped into a plurality of trading floors each trader terminal in a trading floor being connected to the computer communications network and being arranged to generate electronic. order messages including quote messages and/or hit messages; a plurality of trading agents, each trading agent being connected to the communications network for communication with one of the trading floors; a plurality of broking nodes, each broking node being connected to the communications network, each trading agent being arranged to communicate with at least one broking node, each broking node including an order store for storing received quotes in a bid quote queue and an offer quote queue; a matching engine for matching bid and offer orders input into the system from the trader terminals and for assisting in executing deals where orders are matched; a price distributor for providing market information to the trader terminals of the trading floor or trading floors to which the broking node is connected via a trading agent; a credit store for storing credit information for the trading floor or trading floors to which the broking node is connected via a trading agent; the system further including a credit limit agent for each plurality of trading floors for storing credit limits available for trades between that plurality of trading floors and counterparty pluralities of trading floors, and for updating the credit information in the broking nodes of that plurality of trading floors, the method comprising:

a) receiving into the system an electronic order message generated and sent by a maker trader terminal and comprising a quote Q the quote Q being stored in the quote queues of all the broking nodes;

b) receiving into the system an electronic order message generated and sent by a taker trader terminal and comprising a hit H;

c) matching the hit H With the quote Q;

d) checking for available credit between the maker trader terminal and the taker trader terminal; and e) executing a deal between the quote Q and the hit H.

11. A method according to claim 10, wherein step a) comprises:

i) receiving at a maker trading agent the electronic order message generated and sent by the maker trader terminal over the communications network, the quote Q comprising a bid or offer message;

ii) the maker trading agent sending a Quote-Submit message over the communications network to a maker broking node;

iii) the maker broking node storing the quote Q in its quote queue;

iv) the maker broking node sending the Quote-Submit message to all further broking nodes neighbouring the maker broking node;

v) each further broking. node receiving the Quote-Submit message storing the quote in its quote queue;

vi) each further broking node receiving the Quote-Submit message sending the Quote Submit Message to some of its neighbouring broking nodes; and vii) repeating steps v) and vi) until all broking nodes in the trading system have received the Quote-Submit message and have added the quote Q to their quote queue.

12. A method according to claim 10, wherein step b) comprises:

i) receiving at a taker trading agent the electronic order message generated and sent by the taker trader terminal over the communications network, the hit H comprising an offer or bid message; and ii) the taker trading agent sending a Hit-Submit message over the communications network to a taker broking node.

13. A method according to claim 10, wherein step c) comprises:

i) a taker broking node matching the hit H with the quote Q in its quote queue;

ii) the taker broking node amending the status of the matched quote Q to reserved;

iii) the taker broking node sending a Propose-Deal message to the further broking node from which quote Q was received;

iv) each further broking node receiving the Propose-Deal message, amending the status of quote Q in its quote queue to reserved;

v) each further broking node receiving the Propose-Deal message, sending the Propose-Deal message to the further broking node from which quote Q was received; and vi) repeating steps iv) and v) until all broking nodes in the trading system have received the Propose-Deal message and have amended the status of quote Q to reserved.

14. A method according to claim 10, wherein steps d) and e) together comprise:

i) a maker broking node sending a Hit-Amount message to a maker trading agent;

ii) the maker trading agent sending a Hit-Amount-WS message to the maker trader terminal;

iii) on receipt of the Hit-Amount-WS message, the maker trader terminal sending a Hit-Amount-WK message to the maker trading agent;

iv) the maker trading agent sending a Deal-Credit-Maker message to the maker broking node;

v) the maker broking node routing the Deal-Credit-Maker message to a maker credit agent, which stores credit limits available on the maker side, for trades between the plurality of trading floors in which the maker trader terminal is located and a counterparty plurality of trading floors in which the taker trader terminal is located;

vi) the maker credit agent checking for available credit of the maker trader terminal plurality of trading floors with the taker trader terminal plurality of trading floors;

vii) on confirmation that all or part of the required credit is available, the maker credit agent sending a Deal-Status-Maker message to the maker broking node;

viii) the maker broking node amending the status of the matched quote Q to complete and routing the Deal-Status-Maker message to a taker broking node via other broking nodes in the system;

ix) the other broking nodes in the system amending the status of the matched quote Q to complete;

x) the taker broking node amending the status of the matched quote Q to complete and routing the Deal-Status-Maker message to a taker credit agent which stores credit limits available on the taker side, for trades between the plurality of trading floors in which the taker trader terminal is located and a counterparty plurality of trading floors in which the maker trader terminal is located;

xi) the taker credit agent checking for available credit of the taker trader terminal plurality of trading floors with the maker trader terminal plurality of trading floors;

xii) on confirmation that all or part of the required credit is available, the taker credit agent sending a Deal-Credit-Taker message to the taker broking node;

xiii) the taker broking node routing the Deal-Credit-Taker message to a taker trading agent;

xiv) the taker trading agent sending a Deal-Status-Taker message to the maker broking node; and xv) the maker broking node routing the Deal-Status-Taker message to the maker trading agent to complete the deal.

15. A method of executing a deal over an anonymous trading system for anonymous trading of financial instruments between traders that includes a computer communications network for transmitting electronic messages; a plurality of trader terminals grouped into a plurality of trading floors each trader terminal in a trading floor being connected to the computer communications network and being arranged to generate electronic order messages including quote messages and/or hit messages ; a plurality of trading agents, each trading agent being connected to the communications network for communication with one of the trading floors; a plurality of broking nodes, each broking node being connected to the communications network, each trading agent being arranged td communicate with at least one broking node, each broking node including an order store for storing received quotes in a bid quote queue and an offer quote a matching engine for matching bid and offer orders input into the system from the trader terminals and for assisting in executing deals where orders are matched; a price distributor for providing market information to the trader terminals of the trading floor or trading floors to which the broking node is connected via a trading agent; a credit store for storing credit information for the trading floor or trading floors to which the broking node is connected via a trading agent; the system further including a credit limit agent for each plurality of trading floors for storing credit limits available for trades between that plurality of trading floors and counterparty pluralities of trading floors, and for updating the credit information in the broking nodes of that plurality of trading floors, the method comprising:

i) receiving at a maker trading agent an electronic order message generated and sent by a maker trader terminal and comprising a quote Q comprising a bid or offer message, over the communications network;

ii) the maker trading agent sending a Quote-Submit message over the communications network to a maker broking node;

iii) the maker broking node storing the quote Q in its quote queue;

iv) the maker broking node sending the Quote-Submit message to all further broking nodes neighbouring the maker broking node;

v) each further broking node receiving the Quote-Submit message storing the quote in its quote queue;

vi) each further broking node receiving the Quote-Submit message sending the Quote Submit Message to some of its neighbouring broking nodes;

vii) repeating steps v) and vi) until all broking nodes in the trading system have received the Quote-Submit message and have added the quote Q to their quote queue;

viii) receiving at a taker trading agent an electronic order message generated and sent by a taker trader terminal and comprising a hit H comprising an offer or bid message, over the communications network;

ix) the taker trading agent sending a Hit-Submit message over the communications network to a taker broking node;

x) the taker broking node matching the hit H with the quote Q in its quote queue;

xi) the taker broking node amending the status of the matched quote Q to reserved;

xii) the taker broking node sending a Propose-Deal message to the further broking node from which quote Q was received;

xiii) each further broking node receiving the Propose-Deal message, amending the status of quote Q in its quote queue to reserved;

xiv) each further broking node receiving the Propose-Deal message, sending the Propose-Deal message to the further broking node from which quote Q was received;

xv) repeating steps xiii) and xiv) until all broking nodes in the trading system have received the Propose-Deal message and have amended the status of quote Q to reserved;

xvi) the maker broking node sending a Hit-Amount message to the maker trading agent;

xvii) the maker trading agent sending a Hit-Amount-WS message to the maker trader terminal;

xviii) on receipt of the Hit-Amount-WS message, the maker trader terminal sending a Hit-Amount-WK message to the maker trading agent;

xix) the maker trading agent sending a Deal-Credit-Maker message to the maker broking node;

xx) the maker broking node routing the Deal-Credit it-Maker message to a maker credit agent, which stores credit limits available on the maker side, for trades between the plurality of trading floors in which the maker trader terminal is located and a counterparty plurality of trading floors in which the taker trader terminal is located;

xxi) the maker credit agent checking for available credit of the maker trader terminal plurality of trading floors with the taker trader terminal plurality of trading floors;

xxii) on confirmation that all or part of the required credit is available, the maker credit agent sending a Deal-Status-Maker message to the maker broking node;

xxiii) the maker broking node amending the status of the matched quote Q to complete and routing the Deal-Status-Maker message to a taker broking node via other broking nodes in the system;

xxiv) the other broking nodes in the system amending the status of the matched quote Q to complete;

xxv) the taker broking node amending the status of the matched quote Q to complete and routing the Deal-Status-Maker message to a taker credit agent which stores credit limits available on the taker side, for trades between the plurality of trading floors in which the taker trader terminal is located and a counterparty plurality of trading floors in which the maker trader terminal is located;

xxvi) the taker credit agent checking for available credit of the taker trader terminal plurality of trading floors with the maker trader terminal plurality of trading floors;

xxvii) on confirmation that all or part of the required credit is available, the taker credit agent sending a Deal-Credit-Taker message to the taker broking node;

xxviii) the taker broking node routing the Deal-Credit-Taker message to a taker trading agent;

xxix) the taker trading agent sending a Deal-Status-taker message to the maker broking node; and xxx) the maker broking node routing the Deal-Status-Taker message to the maker trading agent to complete the deal.

* * * * *